(12) United States Patent
Lu et al.

(10) Patent No.: US 10,681,257 B2
(45) Date of Patent: Jun. 9, 2020

(54) METHODS AND SYSTEMS FOR TRAFFIC MONITORING

(71) Applicant: ZHEJIANG DAHUA TECHNOLOGY CO., LTD., Hangzhou, Zhejiang (CN)

(72) Inventors: Wei Lu, Zhejiang (CN); Qiankun Li, Zhejiang (CN); Shizhu Pan, Zhejiang (CN); Jichao Geng, Zhejiang (CN); Xiaohui Sun, Zhejiang (CN); Haijiang Pan, Zhejiang (CN); Jinting Wang, Zhejiang (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 75 days.

(21) Appl. No.: 15/752,885

(22) PCT Filed: Aug. 26, 2016

(86) PCT No.: PCT/CN2016/096837
§ 371 (c)(1),
(2) Date: Feb. 14, 2018

(87) PCT Pub. No.: WO2017/032335
PCT Pub. Date: Mar. 2, 2017

(65) Prior Publication Data
US 2018/0241923 A1 Aug. 23, 2018

(30) Foreign Application Priority Data

Aug. 26, 2015 (CN) .......................... 2015 1 0532169
Aug. 31, 2015 (CN) .......................... 2015 1 0547763
Dec. 3, 2015 (CN) .......................... 2015 1 0883221

(51) Int. Cl.
*H04N 5/232* (2006.01)
*G06K 9/00* (2006.01)
(Continued)

(52) U.S. Cl.
CPC ............. *H04N 5/232* (2013.01); *G01B 11/02* (2013.01); *G01B 11/24* (2013.01);
(Continued)

(58) Field of Classification Search
CPC ........... G01B 11/02; G01B 11/24; G06T 7/62; G06T 7/85; G06T 7/593;
(Continued)

(56) References Cited

U.S. PATENT DOCUMENTS 6,674,905 B1 * 1/2004 Matsugu .................. G06T 7/11
382/181
9,109,891 B2 * 8/2015 Yamato .................. G01C 11/06
(Continued)

FOREIGN PATENT DOCUMENTS

CN 101021413 A 8/2007
CN 101399919 A 4/2009
(Continued)

OTHER PUBLICATIONS

Partial search report in European Application No. 16838593.8 dated Jun. 14, 2018, 15 pages.
(Continued)

*Primary Examiner* — Brenda C Bernardi
(74) *Attorney, Agent, or Firm* — Metis IP LLC

(57) ABSTRACT

A system and method for determining a dimension of a target. The method includes: determining a camera parameter, the camera parameter including at least one of a focal length, a yaw angle, a roll angle, a pitch angle, or a height
(Continued)

of one or more cameras; acquiring a first image and a second image of an target captured by the one or more cameras; generating a first corrected image and a second corrected image by correcting the first image and the second image; determining a parallax between a pixel in the first corrected image and a corresponding pixel in the second corrected image; determining an outline of the target; and determining a dimension of the target based at least in part on the camera parameter, the parallax, and the outline of the target.

14 Claims, 22 Drawing Sheets

(51) Int. Cl.
| | | |
|---|---|---|
| H04N 5/235 | (2006.01) | |
| H04N 5/247 | (2006.01) | |
| G06T 7/593 | (2017.01) | |
| G06T 7/62 | (2017.01) | |
| H04N 13/246 | (2018.01) | |
| H04N 13/296 | (2018.01) | |
| G01B 11/02 | (2006.01) | |
| H04N 13/239 | (2018.01) | |
| G01B 11/24 | (2006.01) | |
| G06K 9/62 | (2006.01) | |
| G06K 9/38 | (2006.01) | |
| G06K 9/46 | (2006.01) | |
| G06T 7/80 | (2017.01) | |
| G06K 9/03 | (2006.01) | |
| G06K 9/32 | (2006.01) | |
| H04N 13/00 | (2018.01) | |

(52) U.S. Cl.
CPC ..... *G06K 9/00201* (2013.01); *G06K 9/00785* (2013.01); *G06K 9/03* (2013.01); *G06K 9/3241* (2013.01); *G06K 9/38* (2013.01); *G06K 9/4604* (2013.01); *G06K 9/6201* (2013.01); *G06T 7/593* (2017.01); *G06T 7/62* (2017.01); *G06T 7/85* (2017.01); *H04N 5/2351* (2013.01); *H04N 5/2357* (2013.01); *H04N 5/247* (2013.01); *H04N 13/239* (2018.05); *H04N 13/246* (2018.05); *H04N 13/296* (2018.05); *G06T 2207/10012* (2013.01); *G06T 2207/10016* (2013.01); *G06T 2207/30236* (2013.01); *H04N 2013/0081* (2013.01)

(58) Field of Classification Search
CPC . G06T 2207/10012; G06T 2207/10016; G06T 2207/30236; H04N 13/246; H04N 13/296; H04N 13/239; H04N 5/232; H04N 5/2351; H04N 5/247; H04N 2013/0081; G06K 9/00201; G06K 9/03; G06K 9/3241; G06K 9/38; G06K 9/4604; G06K 9/6201; G06K 9/00785
See application file for complete search history.

(56) References Cited

U.S. PATENT DOCUMENTS

| | | | |
|---|---|---|---|
| 2006/0245618 A1* | 11/2006 | Boregowda | G06T 7/215 382/107 |
| 2007/0247531 A1 | 10/2007 | Deng et al. | |
| 2008/0122928 A1 | 5/2008 | Hutton et al. | |
| 2010/0324770 A1* | 12/2010 | Ramsey | B60D 1/36 701/25 |
| 2011/0103647 A1 | 5/2011 | Leopold et al. | |
| 2012/0127275 A1 | 5/2012 | Von Zitzewitz et al. | |
| 2013/0021628 A1* | 1/2013 | Nakamura | H04N 1/6055 358/1.9 |
| 2013/0033583 A1* | 2/2013 | Lee | H04N 21/41407 348/47 |
| 2013/0076867 A1 | 3/2013 | Sakurai | |
| 2013/0083968 A1* | 4/2013 | Sakamoto | G06K 9/4604 382/103 |
| 2015/0302611 A1* | 10/2015 | Fan | G06T 7/73 382/104 |

FOREIGN PATENT DOCUMENTS

| | | |
|---|---|---|
| CN | 101996399 A | 3/2011 |
| CN | 102012217 A | 4/2011 |
| CN | 102369723 A | 3/2012 |
| CN | 201164799 U | 6/2012 |
| CN | 102679874 A | 9/2012 |
| CN | 102887155 A | 1/2013 |
| CN | 103075973 A | 5/2013 |
| CN | 103162639 A | 6/2013 |
| CN | 103196371 A | 7/2013 |
| CN | 103414834 A | 11/2013 |
| CN | 103414910 A | 11/2013 |
| CN | 103810690 A | 5/2014 |
| CN | 103868460 A | 6/2014 |
| CN | 104236478 A | 12/2014 |
| CN | 104506779 A | 4/2015 |
| JP | 2013114610 A * | 6/2013 |
| JP | 2013114610 A | 6/2013 |
| WO | 2013165377 A1 | 11/2013 |
| WO | 2017032335 A1 | 3/2017 |

OTHER PUBLICATIONS

First Office Action in Chinese Application No. 201510532169.6 dated Jul. 26, 2017, 16 pages.
First Office Action in Chinese Application No. 201510547763,2 dated Apr. 24, 2017, 21 pages.
First Office Action in Chinese Application No. 201510883221.2 dated Jan. 19, 2018, 12 pages.
Bin Chen, Reserch of real-time binocular stereo matching algorithms and implementations, Chinese Doctoral Dissertations Full-Text Database, 4, pp. 17-23, 2015.
Third Office Action in Chinese Application No. 201510547763.2 dated May 9, 2018, 24 pages.
International Search Report in PCT/CN2016/096837 dated Nov. 28, 2016, 4 pages.
Written Opinion in PCT/CN2016/096837 dated Nov. 28, 2016, 5 pages.
The Extended European Search Report in European Application No. 16838593.8 dated Jul. 2, 2019, 19 pages.
Rong Weibin et al., An Improved Canny Edge Detection Algorithm, 2014 IEEE International Conference on Mechatronics and Automation, 577-582, 2014.

* cited by examiner

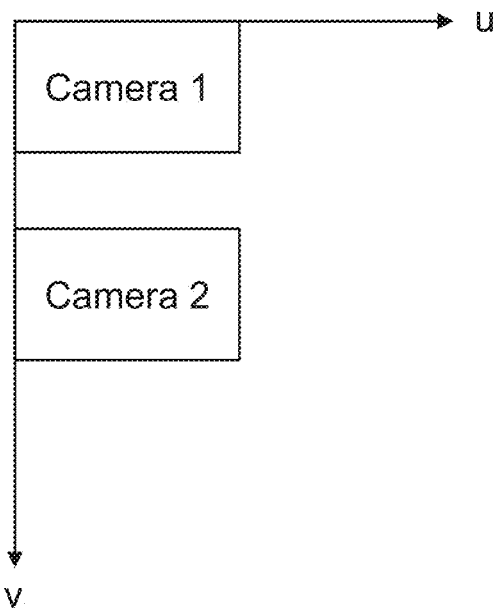
FIG. 3-A
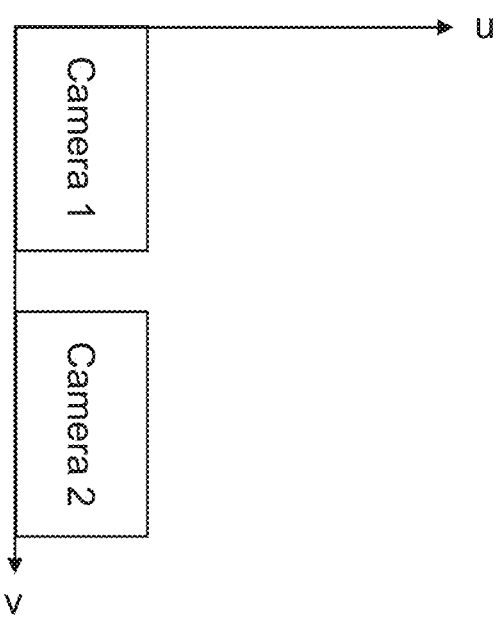
FIG. 3-B

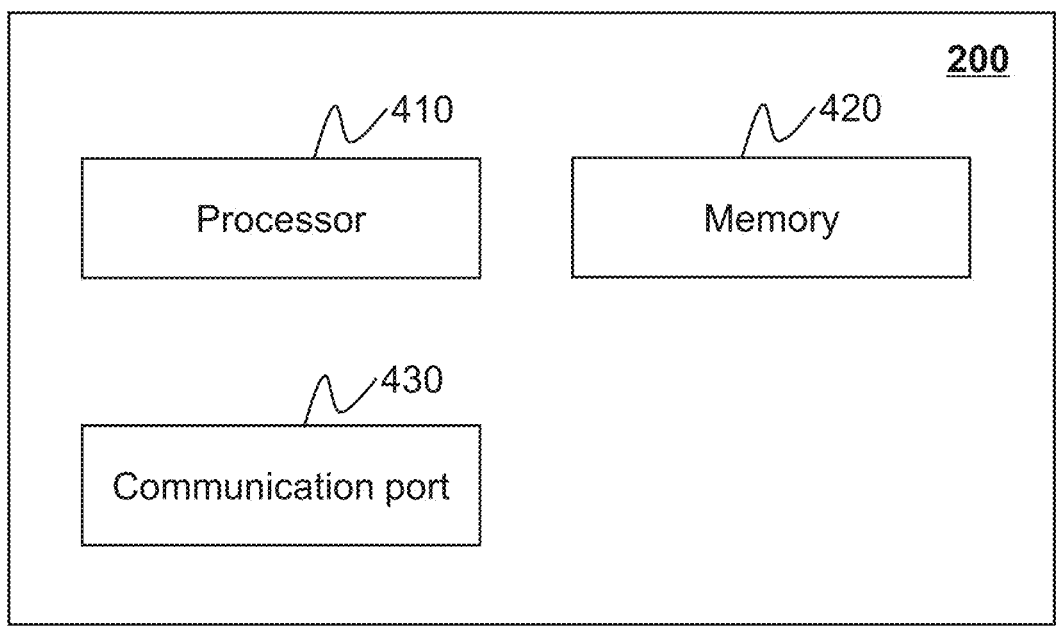
FIG. 4-A

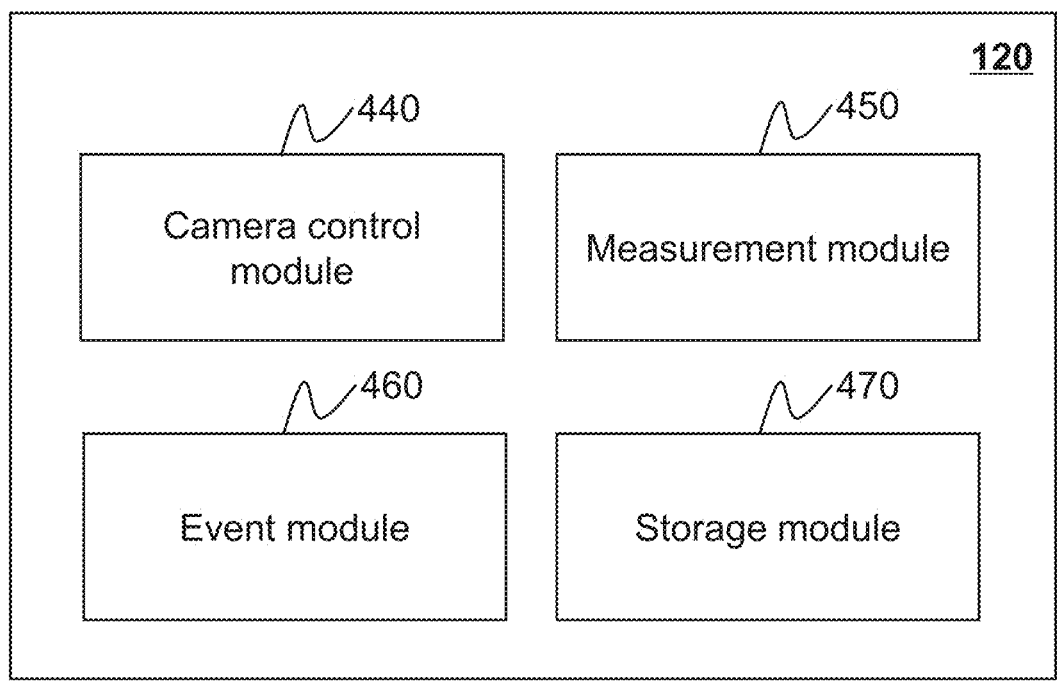
FIG. 4-B

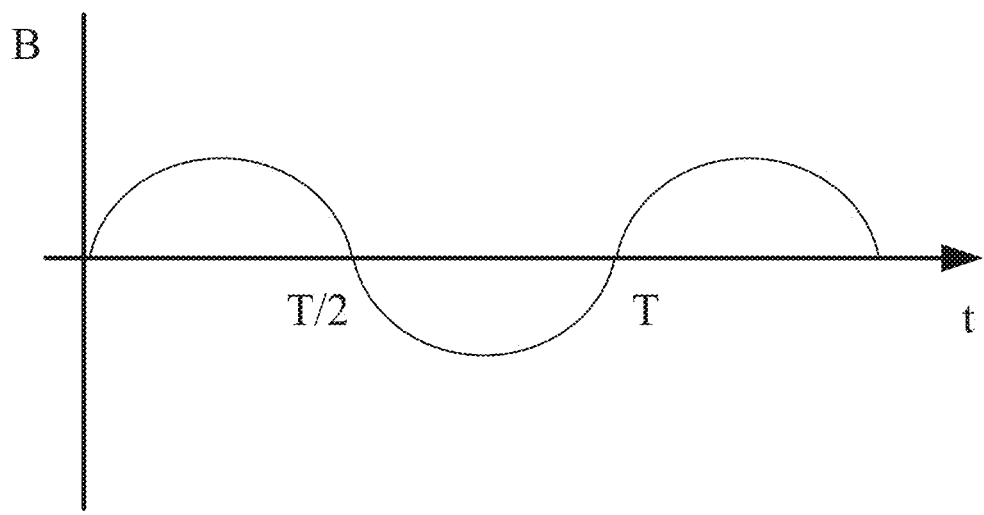
FIG. 10-A
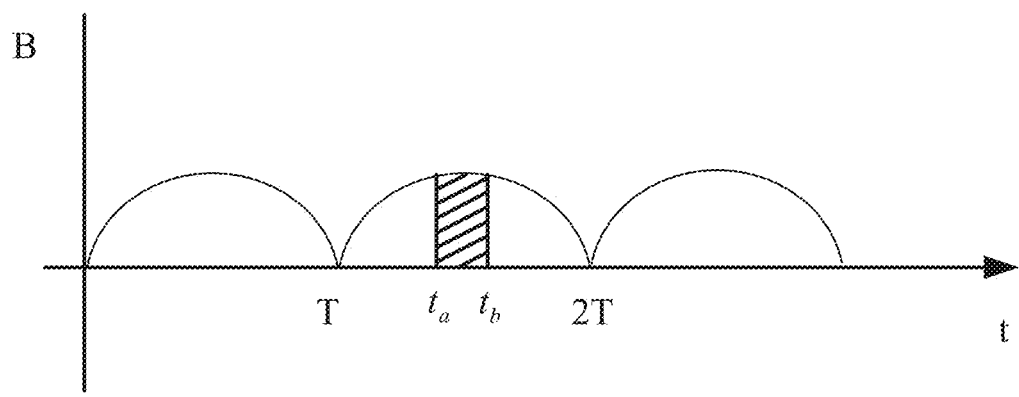
FIG. 10-B

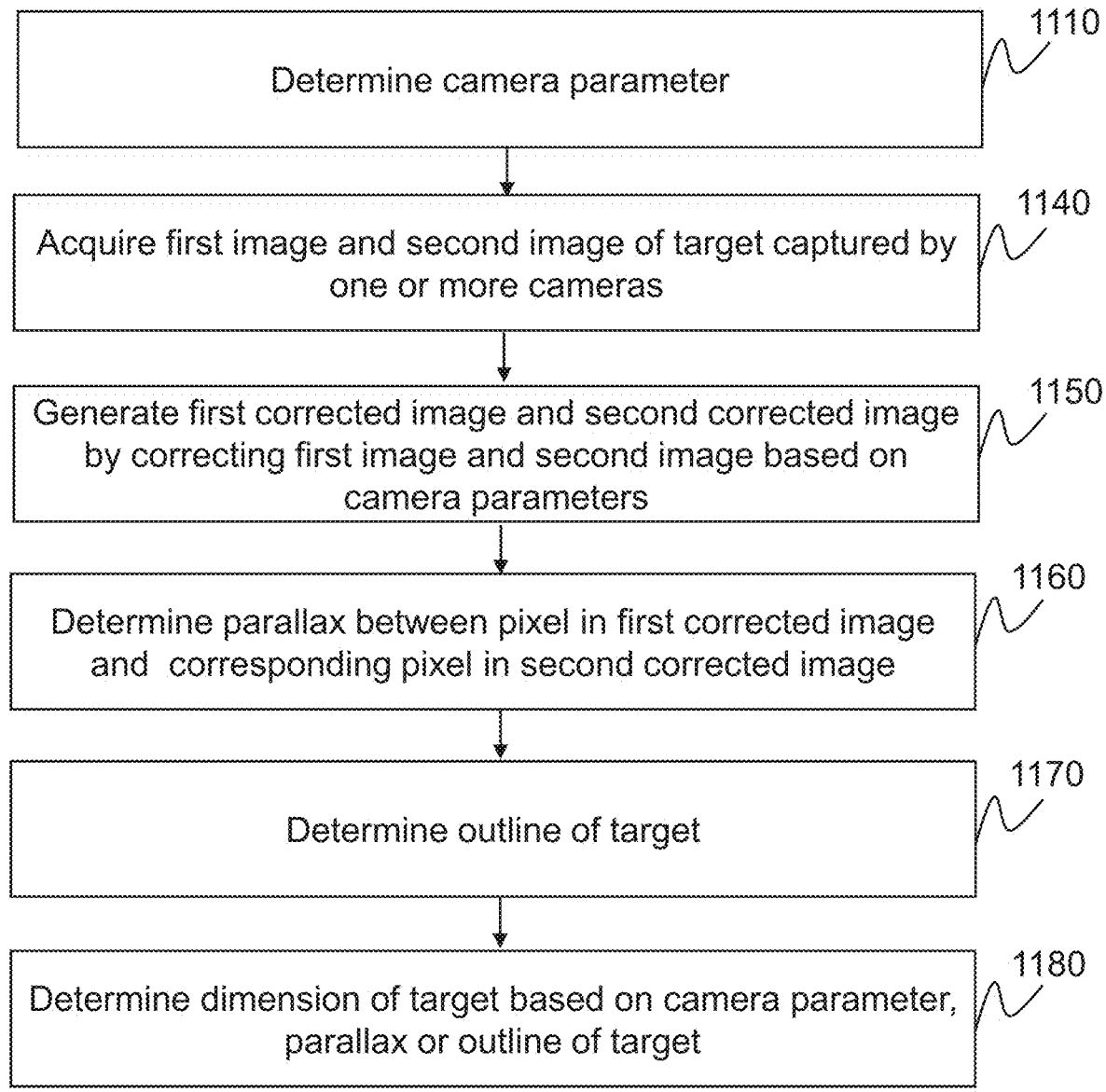
FIG. 11-A

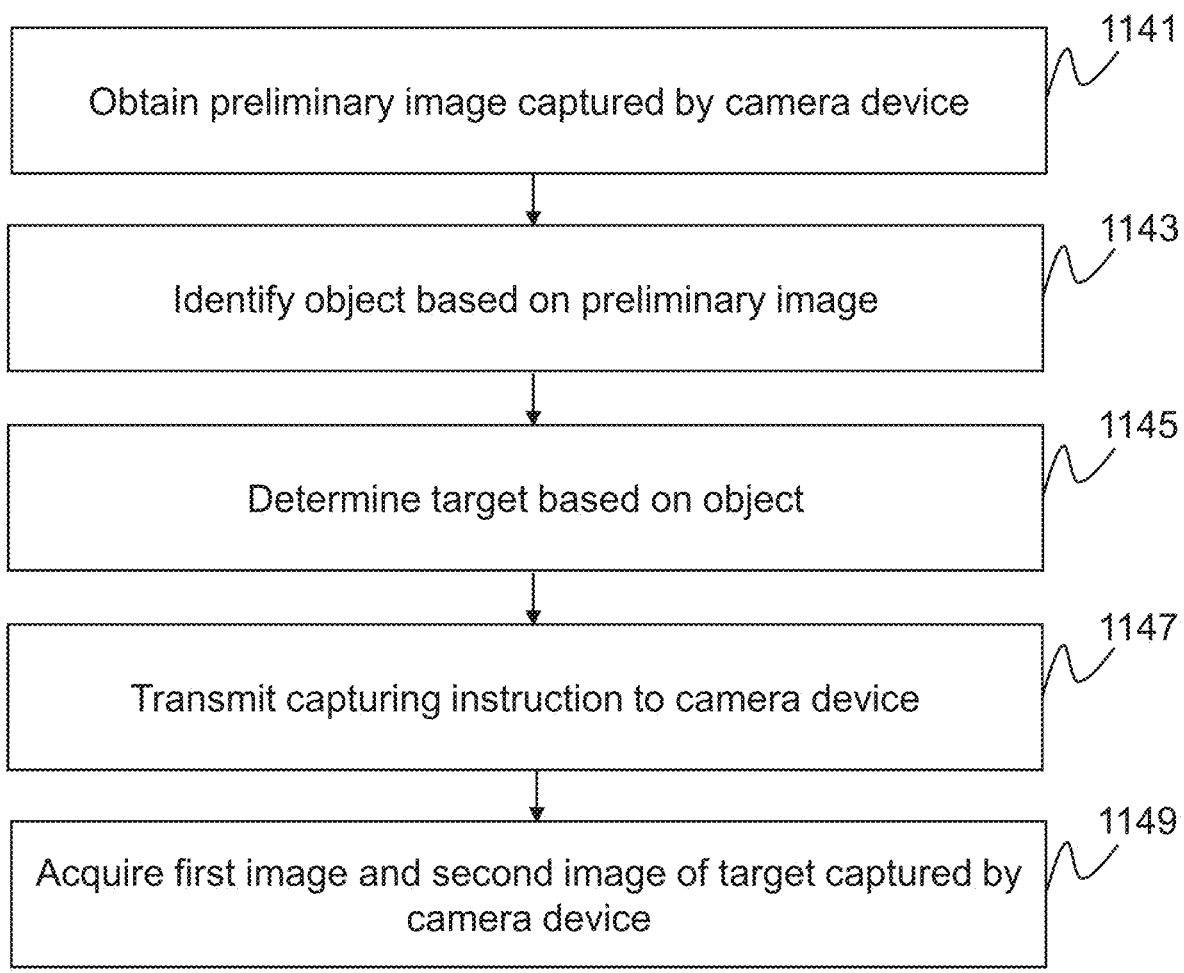
FIG. 11-B

FIG. 14-A
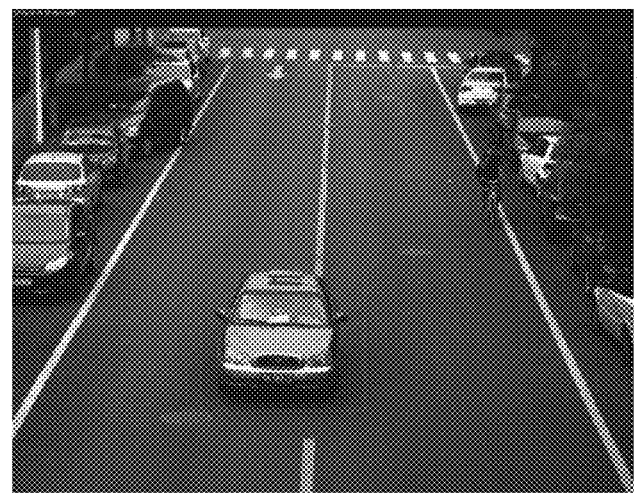
FIG. 14-B

FIG. 15-A
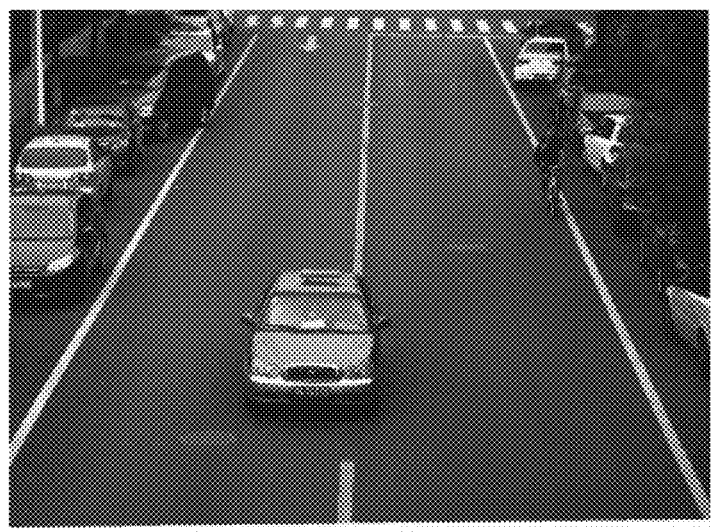
FIG. 15-B

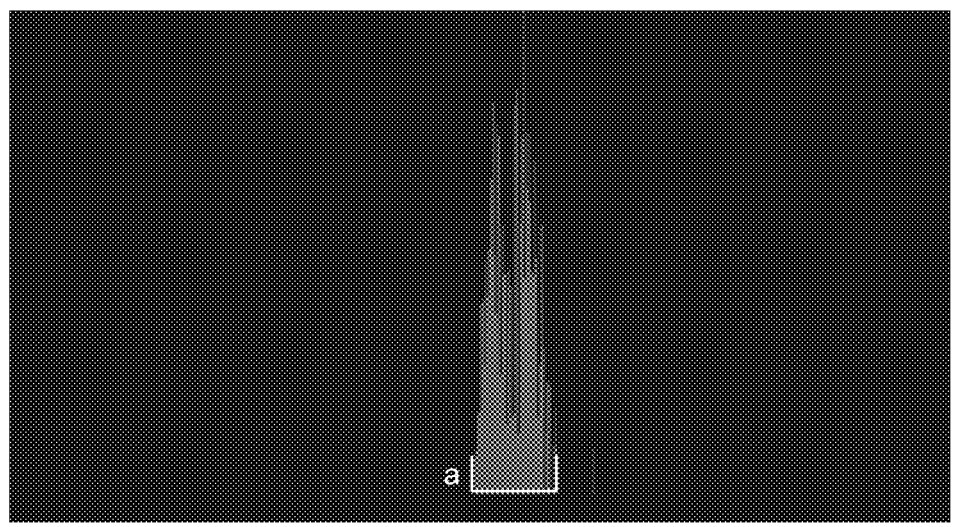
FIG. 19-A
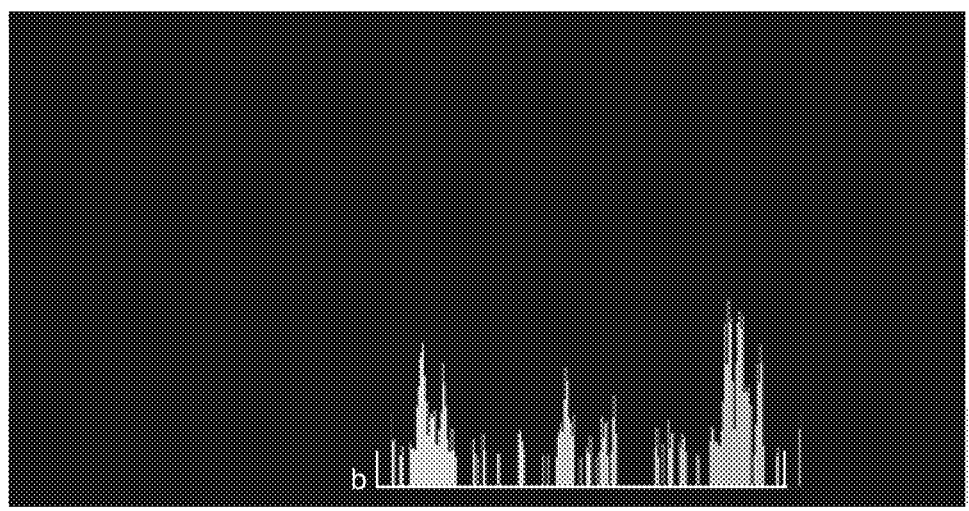
FIG. 19-B
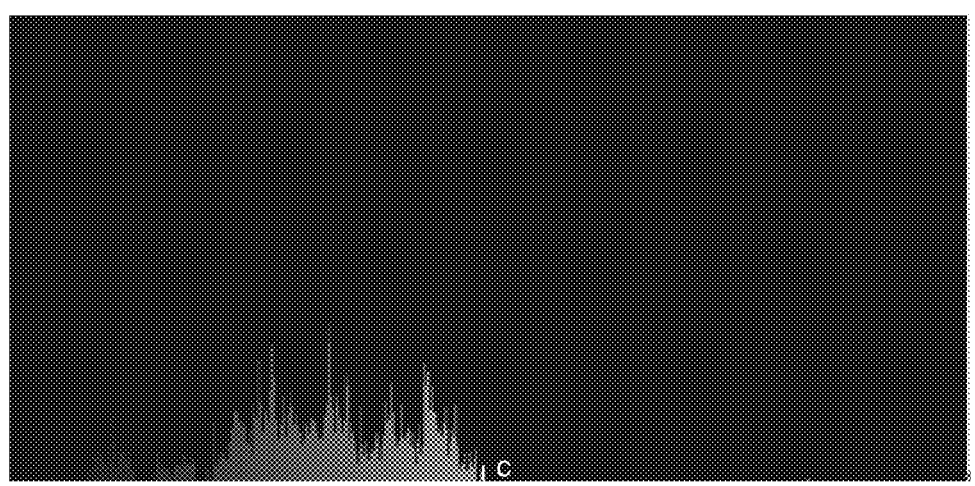
FIG. 19-C

METHODS AND SYSTEMS FOR TRAFFIC MONITORING

CROSS-REFERENCE TO RELATED APPLICATIONS

This application is a U.S. national stage of International Application No. PCT/CN/2016/096837, filed on Aug. 26, 2016, which claims priority of Chinese Patent Application No. 201510532169.6 filed Aug. 26, 2015, Chinese Patent Application No. 201510547763.2 filed Aug. 31, 2015, and Chinese Patent Application No. 201510883221.2 filed Dec. 3, 2015. Each of the above-referenced applications is expressly incorporated herein by reference to their entireties.

TECHNICAL FIELD

The present disclosure generally relates to camera vision system, and more particularly, to a system and method for traffic monitoring.

BACKGROUND

Intelligent transportation system is a trend of development in traffic monitoring. During traffic monitoring, the color of a traffic light in the captured image may deviate from the actual color due to many factors including, for example, underexposure or overexposure. In addition, measuring the size of a vehicle may be complicated or the accuracy may be unsatisfying. It is desirable to provide a system and method for traffic monitoring to improve the accuracy for monitoring and reduce installation complexity.

SUMMARY

In a first aspect of the present disclosure, a method for determining a dimension of a target is provided. The method may include one or more of the following operations. A camera parameter may be determined, and the camera parameter may include at least one of a focal length, a yaw angle, a roll angle, a pitch angle, or a height of one or more cameras. A first image and a second image of an target captured by the one or more cameras may be acquired. A first corrected image and a second corrected image may be generated by correcting the first image and the second image. A parallax between a pixel in the first corrected image and a corresponding pixel in the second corrected image may be determined. An outline of the target may be determined. A dimension of the target may be determined based at least in part on the camera parameter, the parallax, and the outline of the target.

In some embodiments, the determined dimension of the target may include a length, a height, or a width of the target.

In some embodiments, the first image and the second image of the target may be acquired by the one or more cameras by the following operations. One or more preliminary images captured by the one or more cameras may be obtained. An object may be identified based on the one or more preliminary images. A target may be determined based on the object. A capturing instruction for capturing the first image and the second image of the target may be transmitted to the one or more cameras. The first image and the second image of the target may be captured by the one or more cameras according to the capturing instruction.

In some embodiments, the parallax between the pixel in the first corrected image and the corresponding pixel in the second corrected image may be determined by the following operations. An area in the first corrected image may be determined. The parallax between the pixel in the area and the corresponding pixel in the second corrected image may be determined.

In some embodiments, a first outline of the target in the first corrected image may be determined.

In some embodiments, the parallax between the pixel in the area and the corresponding pixel in the second corrected image may be determined by the following operations. A matching cost space of a pixel in the area may be determined. A V-D space may be determined based on the matching cost space. The parallax between a row of pixels in the area and a corresponding row of pixels in the second corrected image may be determined based on the V-D space.

In some embodiments, the V-D space may be determined based on the matching cost space. The matching cost space may be compressed based on pixels in the row in the area according to a condition that a distance between a left edge pixel on the row and a right edge pixel on the row may equal to a first threshold.

In some embodiments, the first outline of the target in the first corrected image may be determined by the following operations. A confidence coefficient of a pixel in the area may be determined based on the matching cost space. The first outline of the target in the first corrected image may be determined based on the confidence coefficient.

In some embodiments, the dimension of the target may be determined based on the camera parameter, the parallax, and the outline of the target by the following operations. A second outline of the target in the second corrected image may be determined based on the parallax. A three-dimensional outline model may be generated based on the camera parameter, the parallax, the first outline of the target in the first corrected image, and the second outline of the target in the second corrected image. The dimension of the target may be determined based on the three-dimensional outline model.

In some embodiments, the second outline of the target in the second corrected image may be determined based on the parallax by the following operations. A first plurality of pixels on the first outline of the target in the first corrected image may be determined. A second plurality of pixels in the second corrected image, the second plurality of pixels corresponding to the first plurality of pixels may be determined. The second outline of the target in the second corrected image may be determined based on the second plurality of pixels and the parallax.

In some embodiments, the first outline of the target in the first corrected image may be determined by the following operations. A response value of each pixel in the area may be obtained by performing an edge fitting to the pixels in the area. Pixels of which the response values are larger than a second threshold may be selected. The first outline of the target in the first corrected image may be determined based on the selected pixels.

In some embodiments, the three-dimensional outline model may be generated based on the camera parameter, the parallax, the first outline of the target in the first corrected image, and the second outline of the target in the second corrected image by the following operations. A three-dimensional outline model in a camera coordinate system may be determined based on the first outline of the target in the first corrected image and the second outline of the target in the second corrected image. The three-dimensional outline model in the camera coordinate system into a three-dimensional outline model in a world coordinate system may be transformed based on the camera parameter.

In some embodiments, the camera coordinate system or the world coordinate system may include an origin, a first coordinate axis, a second coordinate axis, and a third coordinate axis, wherein, in the camera coordinate system, the origin may be an optical center of the camera, the first coordinate axis may be an optical axis of the camera, the second coordinate axis may be an axis parallel to a reference plane and vertical to the first coordinate axis, and the third coordinate axis may be an axis vertical to a plane of the first axis and the second axis; in the world coordinate system, the origin may be a point in the real world, and in the reference plane, the first coordinate axis may be a projection of the first axis of the camera coordinate system on the reference plane, the second coordinate axis may be parallel to the reference plane and vertical to the first axis, and the third coordinate may be vertical to the reference plane.

In some embodiments, the dimension of the target may be determined based on the three-dimensional outline model by the following operations. A point cloud distribution of the three-dimensional outline model along the first coordinate axis, the second coordinate axis, and the third coordinate axis in the world coordinate system may be determined. The length, the height or the width of the target may be determined based on the point cloud distribution.

In some embodiments, the method for determining the dimension of the target may further include an operation of determining whether at least one of the length, the height or the width of the target is larger than a third threshold, a fourth threshold, a fifth threshold, respectively; and determining the target is oversized according to a result of the determination whether at least one of the length, the height, or the width of the target is larger than the third threshold, the fourth threshold, or the fifth threshold, respectively.

In some embodiments, the area in the first corrected image may be determined by the following operations. A dynamic foreground in the first corrected image may be determined. The area may be determined based on the dynamic foreground.

In a second aspect of the present disclosure, a method for capturing an image is provided. The method may include one or more of the following operations: determining an exposure time of a camera; determining a reference brightness of a traffic light in a first reference image captured by the camera; determining an initial phase of alternating current for capturing the image based on the exposure time and the reference brightness; and determining a start time for capturing the image corresponding to the initial phase.

In some embodiments, the exposure time of a camera may be determined by the following operations: determining ambient brightness; and determining an exposure time according to the ambient brightness.

In some embodiments, the ambient brightness may be determined by the following operations: obtaining a second reference image; analyzing brightness data of each pixel in the second reference image; and determining the ambient brightness based on the brightness data of each pixel in the second reference image.

In some embodiments, the ambient brightness may be determined by the following operations: acquiring brightness data in real time by an optical sensor; and determining the ambient brightness based on the brightness data.

In a third aspect of the present disclosure, a system for determining a dimension of a target is provided. The system may include a parameter determination unit configured to determine a camera parameter that includes at least one of a focal length, a yaw angle, a roll angle, a pitch angle or a height of a camera, an image acquisition unit configured to acquire a first image and a second image of an target, a correction unit configured to generate a first corrected image and a second corrected image by correcting the first image and the second image, a parallax determination unit configured to determine a parallax between a pixel in the first corrected image and a corresponding pixel in the second corrected image, an outline determination unit configured to determine an outline of the target, and a dimension determination unit configured to determine a dimension of the target based at least in part on the camera parameter, the parallax, and the outline of the target.

In a fourth aspect of the present disclosure, a system for capturing an image is provided. The system may include an exposure determination unit configured to determine an exposure time of a camera, a reference brightness determination unit configured to determine a reference brightness of a traffic light in a first reference image captured by the camera, a phase determination unit configured to determine an initial phase of alternating current for capturing the image based on the exposure time and the reference brightness, and a capturing unit configured to determine a start time for capturing the image corresponding to the initial phase.

In a fifth aspect of the present disclosure, a device is provided. The device may include memory storing instructions, and at least one processor that executes the instructions to perform operations including: determining a camera parameter, the camera parameter comprising at least one of a focal length, a yaw angle, a roll angle, a pitch angle or a height of a camera; acquiring a first image and a second image of an target based on the camera parameter; generating a first corrected image and a second corrected image by correcting the first image and the second image; determining a parallax between a pixel in the first corrected image and a corresponding pixel in the second corrected image; determining an outline of the target; and determining a dimension of the target based at least in part on the camera parameter, the parallax, and the outline of the target.

In a sixth aspect of the present disclosure, a device is provided. The device may include memory storing instructions, and at least one processor that executes the instructions to perform operations including: determining an exposure time of a camera; determining a reference brightness of a traffic light in a first reference image captured by the camera; determining an initial phase of alternating current for capturing the image based on the exposure time and the reference brightness; and determining a start time for capturing the image corresponding to the initial phase.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-A and FIG. 3-B are schematic diagrams illustrating an exemplary camera device according to some embodiments of the present disclosure;

FIG. 4-A is a schematic diagram illustrating exemplary hardware and software components of an exemplary computing device according to some embodiments of the present disclosure;

FIG. 4-B is a block diagram illustrating an exemplary computing device according to some embodiments of the present disclosure;

FIG. 10-A is a schematic diagram illustrating an exemplary curve graph of an alternating current according to some embodiments of the present disclosure;

FIG. 10-B is a schematic diagram illustrating an exemplary curve graph of a brightness of a traffic light according to some embodiments of the present disclosure;

FIG. 11-A is a flowchart illustrating an exemplary process of determining a dimension of a target according to some embodiments of the present disclosure;

FIG. 11-B is a flowchart illustrating an exemplary process of acquiring a first image and a second image of a target according to some embodiments of the present disclosure;

FIG. 14-A and FIG. 14-B illustrate exemplary images captured by the cameras in a camera device according to some embodiments of the present disclosure;

FIG. 15-A and FIG. 15-B illustrate exemplary corrected images according to some embodiments of the present disclosure;

FIG. 19-A through FIG. 19-C illustrate exemplary images showing a histogram of the z axis, the x axis and the y axis of a point cloud distribution according to some embodiments of the present disclosure.

DETAILED DESCRIPTION

Figure 1:
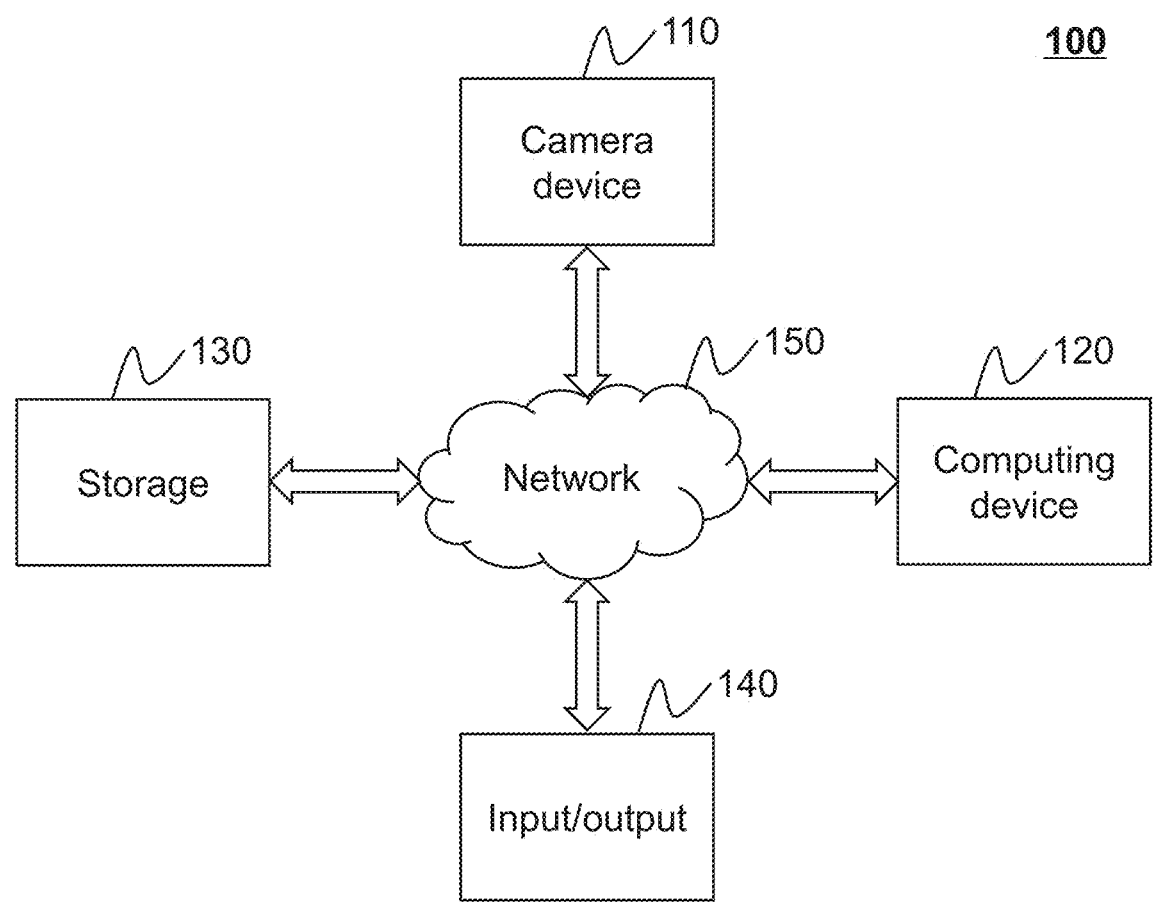
FIG. 1 is a block diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

For illustration purposes, the disclosure describes a system and method for traffic monitoring. The imaging system may be configured to capture one or more images or videos of a traffic element (e.g., a traffic light, a vehicle, or the like), and determine a feature of the traffic element based on the image(s) or video(s). For example, the imaging system may capture an image of the traffic light with an appropriate brightness. As another example, the imaging system may capture one or more images of the vehicle and measure a dimension of the vehicle based on the one or more images.

For persons having ordinary skills in the art, multiple variations or modifications may be made under the teachings of the present disclosure.

The following description is provided to help better understanding an imaging method or system. The term "image" used in this disclosure may refer to a static picture or a video frame of a video. This is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

FIG. 1 is a block diagram illustrating an exemplary imaging system 100 according to some embodiments of the present disclosure. In some embodiments, imaging system 100 may be used in an intelligent transportation system (ITS), a security technology, a transportation management, a prison system, an astronomical observation system, a monitoring system, or the like, or any combination thereof. In some embodiments, imaging system 100 may include a 2D camera system, a 3D camera system, a panoramic camera system, a virtual reality (VR) camera system, a web camera system, an instant picture camera system, an electronic eye system, a camcorder system, a thermal imaging device system, a visible imaging device system, an ultrasonic imaging system, a radiological scanning imaging system, or the like, or any combination thereof. For example, the intelligent transportation system (ITS) may be an imaging system for monitoring traffic violation. The traffic violation may include a red traffic light violation, an overload violation, speeding violation, an illegal parking, a stop sign violation, a failure to use a seat belt, a failure to stop for a school bus, a driving in a car pool lane illegally, a vehicular homicide, or the like, or any combination thereof.

For better understanding the present disclosure, an intelligent transportation system may be described as an example of imaging system 100. It should be noted that imaging system 100 described below is merely provided for illustration purposes and not intended to limit the scope of the present disclosure.

As illustrated in FIG. 1, imaging system 100 may include a camera device 110, a computing device 120, a storage 130, an input/output 140, and a network 150. In some embodiments, camera device 110 and computing device 120 may be integrated as a single device. Alternatively, camera device 110 may be installed at a remote location from computing device 120.

Camera device 110 may be configured to capture an image or video. In some embodiments, camera device 110 may include a stereo camera configured to capture a still image or video. In some embodiments, the stereo camera may include a binocular vision device or a multi-camera. In some embodiments, camera device 110 may include a digital camera. The digital camera may include a 2D camera, a 3D camera, a panoramic camera, a VR (virtual reality) camera, a web camera, an instant picture camera, or the like, or any combination thereof. The digital camera may be added to or be part of a medical imaging equipment, a night vision equipment, a radar system, a sonar system, an electronic eye, a camcorder, a thermal imaging device, a smartphone, a tablet PC, a laptop, a wearable device (e.g., 3D glasses), an eye of a robot, or the like, or any combination thereof. The digital camera may also include an optical sensor, a radio detector, an artificial retina, a mirror, a telescopes, a microscope, or the like, or any combination thereof.

In some embodiments, camera device 110 may capture one or more images of an object. The object may include a still vehicle, a moving vehicle, a passenger, a traffic light, a traffic sign, a road type, or the like, or any combination thereof. In some embodiments, camera device 110 may capture a plurality of images at the same time by two cameras or at different times by one camera. For example, camera device 110 may capture a first image of an object at a first time and a second image of the object at a second time. In some embodiments, camera device 110 may capture images corresponding to the same (or substantially similar) field of view (FOV) or different FOVs. For example, size of the FOV may be adjusted according to position of a camera, orientation of a camera, time of capturing, or the like, or a combination thereof.

In some embodiments, camera device 110 may transmit the captured video and/or image to computing device 120, storage 130 and/or input/output 140 via network 150.

Computing device 120 may be configured to process data and/or generate a control signal for imaging system 100. In some embodiments, the data may include image data or video data. In some embodiments, the data may be analog or digital. In some embodiments, computing device 120 may generate a control signal including, for example, a control signal for camera device 110 to capture an image, a control signal for identifying an object from an image, a control signal for storing/deleting data, a control signal for transmitting data among components of imaging system 100, or the like, or any combination thereof. In some embodiments, the control signal may be generated based on the data received from camera device 110, storage 130, input/output 140, or instructions from a user.

In some embodiments, computing device 120 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, computing device 120 may include a microprocessor to process an image captured by camera device 110.

In some embodiments, computing device 120 may acquire data from camera device 110, storage 130, and/or input/output 140 via network 150. In some embodiments, data and/or image(s) processed by computing device 120 may be saved to storage 130. In some embodiments, computing device 120 may include storage 130 configured to store data and/or instructions.

Storage 130 may be configured to store data from camera device 110, computing device 120, input/output 140, and/or other component(s) of imaging system 100. In some embodiments, storage 130 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage 130 may be configured to store one or more programs and/or instructions that may be executed by the processor(s) of imaging system 100 to perform exemplary methods described in the this disclosure. For example, storage 130 may be configured to store program(s) and/or instruction(s) executed by the processor(s) of imaging system 100 to capture image(s) or video(s), process image data or video data, or display any intermediate result. For example, a ROM may store an algorithm for computing device 120 to process image(s) and/or video(s).

Input/output 140 may be configured to receive information from or output information to camera device 110, computing device 120, storage 130, and/or other component(s) of imaging system 100. In some embodiments, input/output 140 may include a keyboard, a liquid crystal display (LCD), a light emitting diode (LED) based display, a flat panel display, a cathode ray tube (CRT), a 3D display, a plasma display panel, a touch screen, a mouse, a remote controller, or the like, or any combination thereof. In some embodiments, the information displayed on input/output 140 may include an image, a video, a user interface, a value, a text, control information, a program, software, an algorithm, or the like, or any combination thereof. In some embodiments, the image may include an original image, a reconstructed image, a processed image, or the like, or any combination thereof. In some embodiments, the user interface may include a user interaction interface, a graphical user interface, a user-defined interface, or the like, or any combination thereof. In some embodiments, the control information may include a capture control parameter, a measurement parameter, an adjustment parameter, or the like, or any combination thereof.

Network 150 may be configured to facilitate communications among the components of imaging system 100 including camera device 110, computing device 120, storage 130, and input/output 140. For example, network 150 may transmit data from camera device 110 to computing device 120. As another example, network 150 may transmit data processed and/or generated by computing device 120 to input/output 140.

In some embodiments, network 150 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, camera device 110, computing device 120, storage 130, input/output 140, or network 150 may be connected to or communicate with each other directly or indirectly.

In some embodiments, camera device 110, computing device 120, storage 130, and input/output 140 may be integrated as one device. In some embodiments, function of imaging system 100 disclosed in this application may be implemented by camera device 110, computing device 120, storage 130, input/output 140, or network 150, or any combination thereof.

In some embodiments, two or more components of camera device 110, computing device 120, storage 130 and input/output 140 may be integrated with each other. For example, computing device 120 and input/output 140 may be integrated as a one device. As another example, camera device 110 and computing device 120 may be integrated as a one device. In some embodiments, one or more of the above components may be located remote from each other. Merely by way of example, computing device 120 may be implemented on a cloud platform (e.g., a cloud computing platform or cloud storing platform). As another example, input/output 140 may be controlled by a remote system (e.g., a remote medical system or a remote security system).

It should be understood that, the component of imaging system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, input/output 140 may be integrated in computing device 120.

Figure 2:
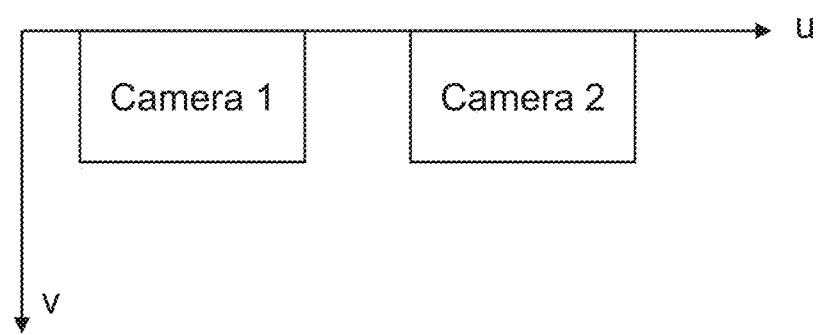
FIG. 2 is a schematic diagram illustrating an exemplary camera device according to some embodiments of the present disclosure.

FIG. 2 is a schematic diagram illustrating an exemplary camera device 110 according to some embodiments of the present disclosure. In some embodiments, camera device 110 may be a binocular vision device including two cameras (e.g., camera 1 and camera 2 illustrated in FIG. 2). The binocular vision device may be installed in a portal frame. In some embodiments, the two cameras may be integrated as one device and installed in one portal frame.

As illustrated in FIG. 2, camera 1 and camera 2 may be placed horizontally. As used herein, "placed horizontally" may refer to a configuration in which camera 1 and camera 2 may be placed adjacently to each other along horizontal direction in the u-v plane, and optical axes of camera 1 and camera 2 may be parallel to each other. In some embodiments, an optical center line (hereafter referred as a baseline) of camera 1 and camera 2 may be parallel to a horizontal line of a reference (e.g., a road), and the optical axes of camera 1 and camera 2 may direct to a zone to be monitored.

FIG. 3-A and FIG. 3-B are schematic diagrams illustrating an exemplary camera device 110 according to some embodiments of the present disclosure. In some embodiments, camera device 110 may be a binocular vision device with two cameras (e.g., camera 1 and camera 2 illustrated in FIG. 3-A). As illustrated in FIG. 3-A and FIG. 3-B, camera device 110 may be placed vertically. As used herein, "placed vertically" may refer to a configuration in which camera 1 and camera 2 may be placed adjacently to each other along vertical direction in the u-v plane, and optical axes of the camera 1 and camera 2 may be parallel to each other. In some embodiments, the baseline of camera 1 and camera 2 may be parallel or vertical to a horizontal line of a reference (e.g., a road). In some embodiments, the baseline of camera 1 and camera 2 may be set as any direction with any angle with the horizontal direction.

It should be noted that the above descriptions in FIGS. 2, 3-A, and 3-B are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, camera device 110 may be a multi-vision device including more than two cameras. As another example, camera 1 and camera 2 may be placed along any direction, and there may be a certain angle between the optical axe of camera 1 and that of camera 2.

FIG. 4-A is a schematic diagram illustrating exemplary hardware and software components of processing device 200 on which computing device 120 or input/output 140 may be implemented according to some embodiments of the present disclosure. In some embodiments, processing device 200 may include a processor 410, a memory 420, and a communication port 430. Processor 410 may execute computer instructions (program code) and perform functions in accordance with techniques described herein. Computer instructions may include routines, programs, objects, components, data structures, procedures, modules, and functions, which perform particular functions described herein. For example, processor 410 may process image data or video data received from camera device 110, storage 130, input/output 140, or any other component of imaging system 100. In some embodiments, processor 410 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, processor 410 may include a microcontroller to process data from camera device 110 for a three-dimensional reconstruction.

Memory 420 may be configured to store data, image(s) and/or video(s) received from camera device 110, storage 130, input/output 140, or any other component of imaging system 100. In some embodiments, memory 420 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, memory 420 may be configured to store one or more programs and/or instructions to perform exemplary methods described in the present disclosure. For example, memory 420 may store a program for computing device 120 in order to determine an outline of a vehicle in an image.

Communication port 430 may be configured to transmit to and receive information or data from camera device 110, storage 130, and/or input/output 140 via network 150. In some embodiments, communication port 304 may include a wired port (e.g., a Universal Serial Bus (USB) port, a High Definition Multimedia Interface (HDMI) port, or the like) or a wireless port (a Bluetooth port, an infrared interface, a WiFi port, or the like).

FIG. 4-B is a block diagram illustrating an exemplary computing device 120 according to some embodiments of the present disclosure. In some embodiments, computing device 120 may include a camera control module 440, a measurement module 450, an event module 460, and a storage module 470.

Camera control module 440 may be configured to generate a control signal. Camera control module 440 may be implemented via processor 410. In some embodiments, the control signal may be transmitted by communication port 430 from computing device 120, to camera device 110, storage 130, input/output 140 via network 150. The control signal may include, for example, a control signal for setting a camera parameter, a control signal for capturing an image, a control signal for identifying an object, a control signal for storing/deleting data, a control signal for transmitting data among component(s) of imaging system 100, or the like, or any combination thereof. For example, camera control module 440 may generate a control signal for camera device 110 to capture an image in a specific stating time. As another example, camera control module 440 may generate a control signal for camera device 110 to capture an image over a certain time interval. In some embodiments, the control signal may include a capture control parameter, a measurement parameter, an adjustment parameter, or the like, or a combination thereof. For example, camera control module 440 may generate a measurement parameter for measurement module 450 in order to determine an outline of a vehicle in an image.

In some embodiments, the control signal generated by camera control module 440 may include an electrical signal, an analog signal, a digital signal, a mechanical signal, a pneumatic signal, a hydraulic signal, a laser signal, a geophysical signal, a sonar signal, a radar signal, a medical signal, a musical signal, or the like, or any combination thereof. Merely by way of example, the electrical signal may include a voltage, a current, a frequency, or the like, or any combination thereof. For example, camera control module 440 may generate an electrical signal for camera device 110 to capture an image at a specific starting time. As a further example, camera control module 440 may generate an electrical signal for storage 130 to store data and/or images generated by camera device 110. In some embodiments, the control signal may be expressed as, for example, an audio, a video, a text, a picture, or the like, or any combination thereof.

Measurement module 450 may be configured to process data and/or image(s) from camera device 110, storage 130, and/or input/output 140. In some embodiments, measurement module 450 may perform one or more operations including, for example, processing acquired data, determining camera parameter(s), determining a feature of a target (e.g., a vehicle), or the like, or any combination thereof. For example, measurement module 450 may determine a dimension of a vehicle included in an image. In some embodiments, measurement module 450 may be implemented by processor 410.

Event module 460 may be configured to determine an event based on the data and/or image(s) received. In some embodiments, event module 460 may analyze data and/or image(s) from camera control module 440, measurement module 450, storage module 470, camera device 110, storage 130, input/output 140, and/or any other component of imaging system 100. The event may include a traffic violation, a traffic congestion, an accident, or the like, or any combination thereof. The traffic violation may include a red traffic light violation, an overload violation, a speeding violation, an illegal parking, a stop-sign violation, a failure to use a seat belt, a failure to stop for a school bus, a driving in a car pool lane illegally, a vehicular homicide, or the like, or any combination thereof. For example, event module 460 may determine a traffic violation (e.g., an overload violation) based on a dimension of a vehicle determined by measurement module 450. As another example, event module 460 may determine a red traffic light violation by a car that occurs, based on an image of the car captured by camera device 110.

In some embodiments, event module 460 may be implemented by processor 410. In some embodiments, event module 460 may be implemented based on instructions from a user based on data and/or image(s) in imaging system 100. The user may include a traffic police, an auxiliary police, a driver, a passenger, an insurance company, or the like, or any combination thereof. For example, the traffic police may determine a failure to use a seat belt based on an image captured by camera device 110. In some embodiments, event module 460 may transmit data and/or image(s) to camera control module 440, measurement module 450, storage module 470, camera device 110, storage 130, input/output 140, and/or any other component of imaging system 100.

Storage module 470 may be configured to store data and/or image(s) from camera control module 440, measurement module 450, storage module 470, camera device 110, storage 130, input/output 140, and/or any other component of imaging system 100. In some embodiments, storage module 470 may be implemented via memory 420.

In some embodiments, storage module 470 may include a mass storage, a removable storage, a volatile read-and-write memory, a read-only memory (ROM), or the like, or any combination thereof. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage module 470 may be configured to store one or more events (e.g., traffic violations), programs, instructions, or the like, or any combination thereof. For example, storage module 470 may store a red traffic light violation based on data from event module 460, in order to record an evidence for a traffic fine.

It should be noted that the above description of computing device 120 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, memory 420 and/or storage module 470 may be optional, and computing device 120 may share a memory with camera device 110 or input/output 140. As another example, any two or more modules in computing device 120 may be integrated as a single device.

Figure 5:
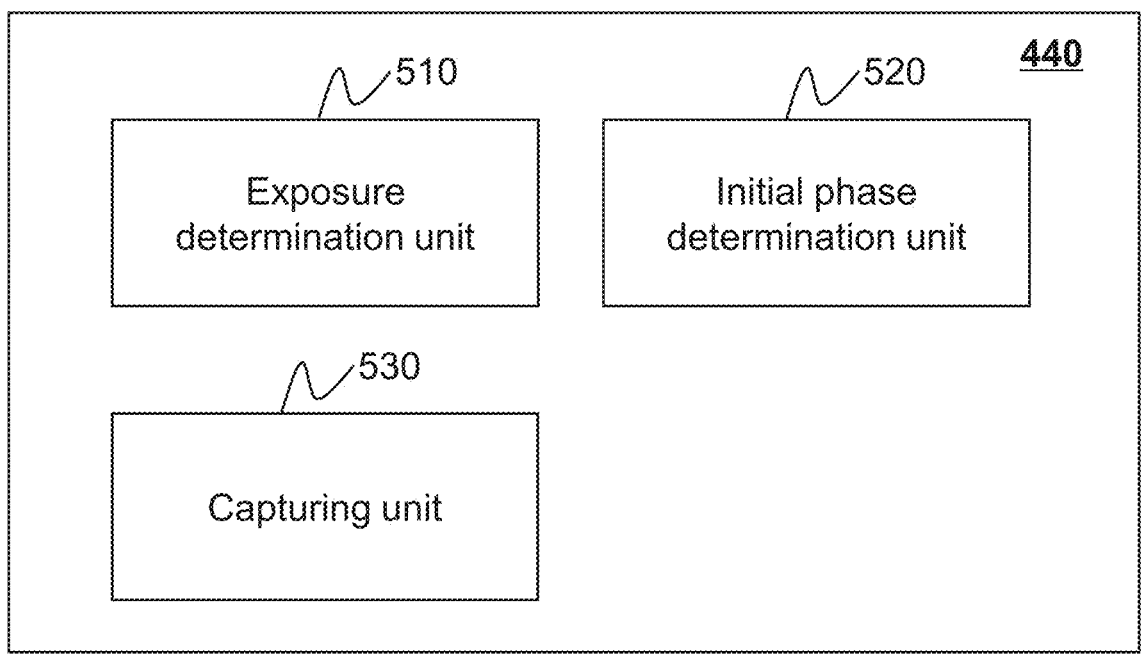
FIG. 5 is a block diagram illustrating an exemplary camera control module according to some embodiments of the present disclosure.

FIG. 5 is a block diagram illustrating an exemplary camera control module 440 according to some embodiments of the present disclosure. In some embodiments, camera control module 440 may include an exposure determination unit 510, an initial phase determination unit 520, and a capturing unit 530.

Exposure determination unit 510 may be configured to determine exposure information (e.g., exposure time) for camera device 110. The exposure time may be proportional to an amount of light per unit area reaching a photographic film or an electronic imaging sensor of camera device 110. In some embodiments, exposure determination unit 510 may determine the exposure time based on a shutter speed, a lens aperture, an ambient brightness, or the like, or any combination thereof. For example, a slower shutter speed may correspond to a longer exposure time for a medium (e.g., a photographic film). As another example, exposure determination unit 510 may determine the exposure time based on the ambient brightness (e.g., a higher ambient brightness may correspond to a shorter exposure time).

Initial phase determination unit 520 may be configured to determine an initial phase of a current for capturing based on an exposure time. Initial phase determination unit 520 determine a starting time for capturing an image based on the initial phase of the current for capturing. In some embodiments, the current may include a direct current or an alternating current. In some embodiments, the alternating current may include different frequencies (e.g., 60 Hz, 50 Hz, or the like). In some embodiments, a waveform of the alternating current may include a sine wave, a triangular wave, a square wave, or the like, or any combination thereof. Merely by way of example, initial phase determination unit 520 may determine an initial phase of an alternating current for capturing.

Capturing unit 530 may be configured to control a capturing process based on the exposure time and the initial phase of the alternating current. In some embodiments, the capturing process may include identifying an object, determining a target, setting camera parameter(s) for capturing, identifying a scene of image, determining a dimension of an object, or the like, or any combination thereof. In some embodiments, capturing unit 530 may generate a control signal for camera device 110 to capture an image based on the initial phase. The control signal may include a control signal for capturing an image, a control signal for storing or deleting data, a control signal for transmitting data among components in imaging system 100, or the like, or any combination thereof. In some embodiments, camera device 110 may capture an image based on the initial phase determined by initial phase determination unit 520 according to the control signal for capturing an image. For example, the control signal for capturing an image may include an exposure time, a shutter speed or a starting time for capturing an image, or the like.

It should be noted that the above description of camera control module 440 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, capturing unit 530 may be optional, and the exposure time and initial phase may be transmitted to camera device 110 directly from initial phase determination unit 520.

Figure 6:
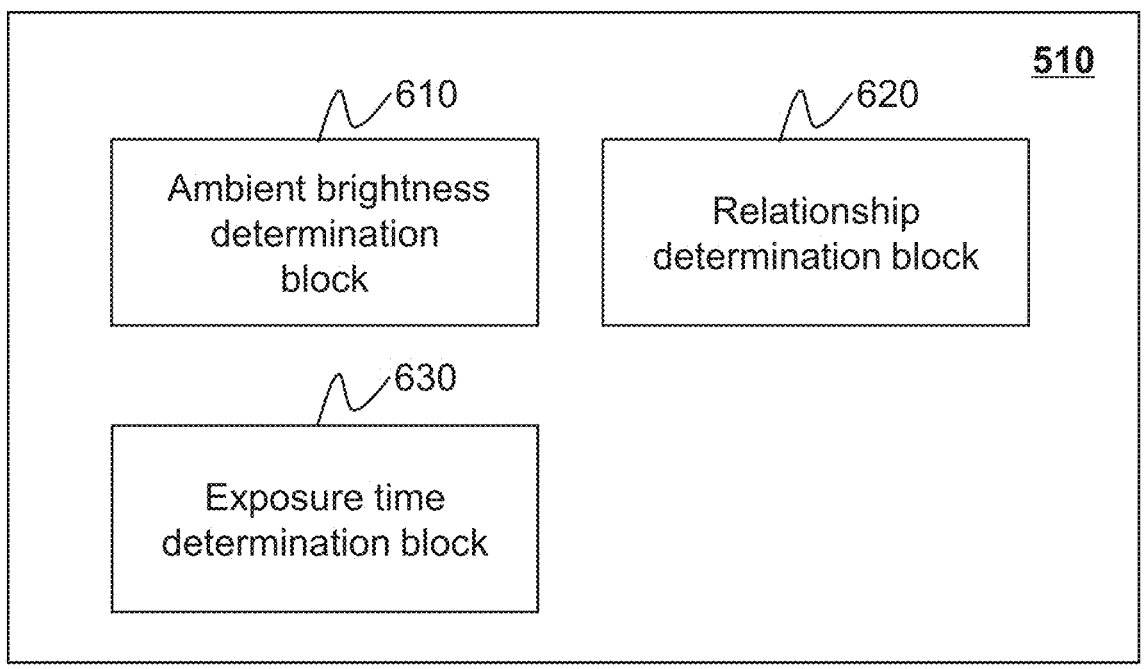
FIG. 6 is a block diagram illustrating an exemplary exposure determination unit according to some embodiments of the present disclosure.

FIG. 6 is a block diagram illustrating an exemplary exposure determination unit 510 according to some embodiments of the present disclosure. In some embodiments, exposure determination unit 510 may include an ambient brightness determination block 610, a relationship determination block 620, and an exposure time determination block 630.

Ambient brightness determination block 610 may be configured to determine ambient brightness. The ambient brightness may be vary over the course of a day. For example, the ambient brightness during the day time may be higher than that the night time. In some embodiments, ambient brightness determination block 610 may determine the ambient brightness based on an image captured by camera device 110 or a signal acquired by an optical sensor in camera device 110.

Relationship determination block 620 may be configured to determine a relationship between an ambient brightness and an exposure time. In some embodiments, relationship determination block 620 may determine the relationship based on a parameter table, an algorithm, a formula, statistical data, or the like, or any combination thereof. As used herein, a parameter table may refer to a lookup table showing one-to-one relationships between various ambient brightnesses and exposure times. In some embodiments, the parameter table may be stored in relationship determination block 620, storage module 470, storage 130, network 150, or the like, or any combination thereof.

Exposure time determination block 630 may be configured to determine an exposure time based on the ambient brightness and/or the relationship between the ambient brightness and the exposure time. In some embodiments, exposure time determination block 630 may determine the exposure time based on an algorithm, a program, a formula, instructions from a user, or the like, or a combination thereof. For example, exposure time determination block 630 may determine the exposure time based on the relationship between ambient brightness and exposure time. In some embodiments, exposure time determination block 630 may determine the exposure time directly. For example, during night time, exposure time determination block 630 may determine a constant exposure time based on darkness of the night. In some embodiments, exposure time determination block 630 may determine the exposure time based on empirical data, default settings of imaging system 100, or an instruction from a user.

It should be noted that the above description of exposure determination unit 510 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, relationship determination block 620 may be optional. As another example, relationship determination block 620 may be integrated in any block in exposure determination unit 510.

Figure 7:
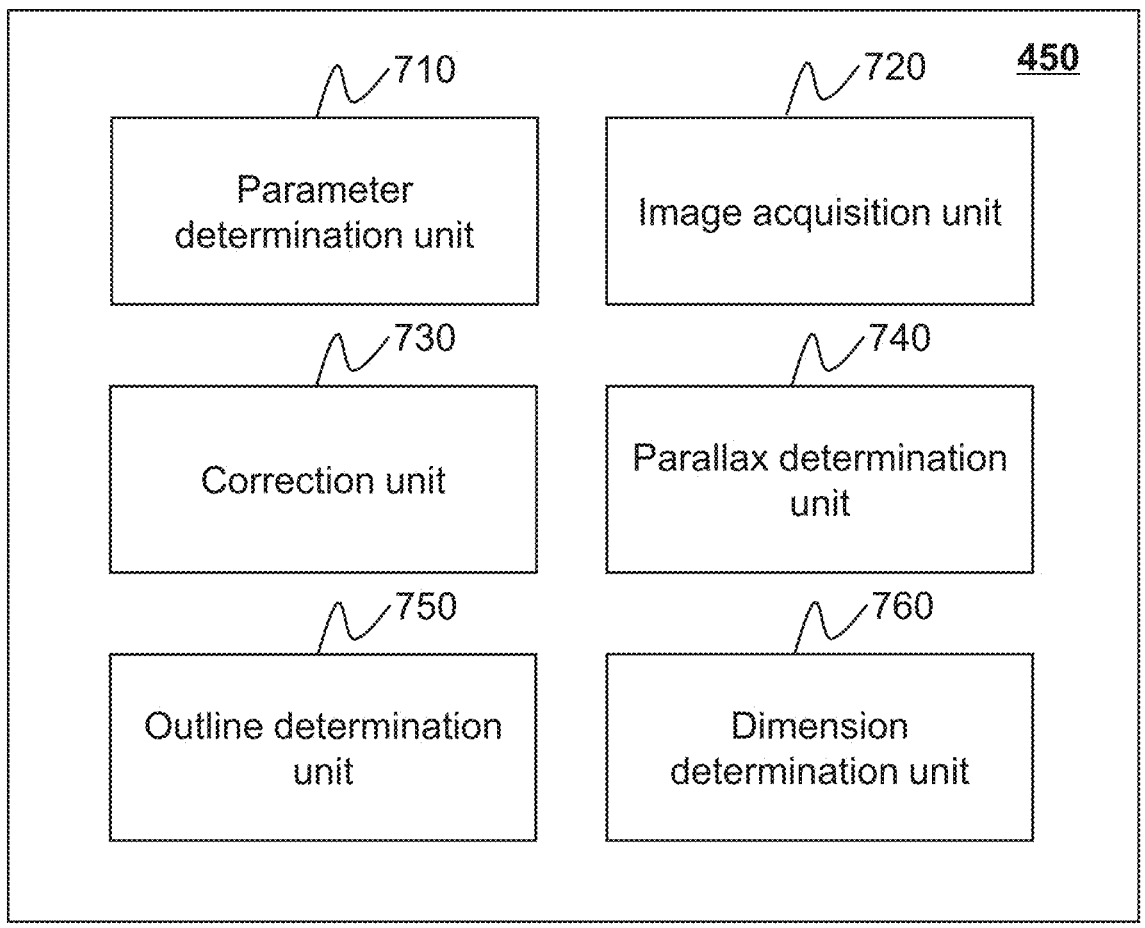
FIG. 7 is a block diagram illustrating an architecture of an exemplary measurement module according to some embodiments of the present disclosure.

FIG. 7 is a block diagram illustrating an architecture of an exemplary measurement module 450 according to some embodiments of the present disclosure. As illustrated, measurement module 450 may include a parameter determination unit 710, an image acquisition unit 720, a correction unit 730, a parallax determination unit 740, an outline determination unit 750, and a dimension determination unit 760.

Parameter determination unit 710 may be configured to determine one or more camera parameters of one or more cameras of camera device 110. In some embodiments, the one or more camera parameters may include a relationship between a camera coordinate system and a world coordinate system. Measurement module 450 may perform a transformation between the camera coordinate system and the world coordinate system based on the relationship. As used herein, in the camera coordinate system, the origin of the camera coordinate system may be an optical center of one of the one or more cameras of camera device 110. A first coordinate axis of the camera coordinate system (also referred to as a z axis of the camera coordinate system) may be an optical axis of the camera. A second coordinate axis of the camera coordinate system (also referred to as an x axis of the camera coordinate system) may be an axis parallel to a reference plane and vertical to the z axis of the camera coordinate system. A third coordinate axis of the camera coordinate system (also referred to as a y axis of the camera coordinate system) may be an axis vertical to a plane of the x axis and z axis of the camera coordinate system. As used herein, the reference plane may be a plane with an area (e.g., an area of larger than 1 square meter) that is static, in a view of one of the cameras of camera device 110. For example, the reference plane may be a surface of the ground, or a surface of a table. As used herein, the world coordinate system may be a coordinate system constructed according to the real world. The origin of the world coordinate system may be a point in the real world that is in the reference plane. A first coordinate axis of the world coordinate system (also referred to as a z axis of the world coordinate system) may be a projection of the z axis of the camera coordinate system on the reference plane. A second coordinate axis of the world coordinate system (also referred to as an x axis of the world coordinate system) may be parallel to the reference plane and vertical to the z axis of the world coordinate system. A third coordinate axis of the world coordinate system (also referred to as a y axis of the world coordinate system) may be vertical to the reference plane.

In some embodiments, the one or more camera parameters may include an intrinsic parameter or an extrinsic parameter. The intrinsic parameter may include an optical parameter of the one or more cameras, for example, a focal length, a principle point, a length of a baseline, a lens distortion parameter, or the like, or a combination thereof. As used herein, the principle point may refer to an intersection point of an optical axis and an imaging plane of a camera. The length of the baseline may refer to a length between two optical centers of two cameras. The extrinsic parameter may include a pose and a position parameter of the one or more cameras of camera device 110, for example, a pitch angle, a roll angle, a yaw angle, a height, or the like, or a combination thereof. As used herein, the tile angle may refer to a rotation angle along a horizontal axis. The yaw angle may refer to a rotation angle along a vertical axis. The roll angle may refer to a rotation angle along an axis vertical to a plane of the vertical axis and the horizontal axis.

Image acquisition unit 720 may be configured to acquire one or more images including the target captured by the one or more cameras of camera device 110. In some embodiments, the target may include a vehicle, a boat, a flying machine, a package, a baggage, etc. In some embodiments, image acquisition unit 720 may acquire more than one image. When the target is still, the more than one image may be captured by more than one camera, or by one camera moved to different positions. When the target is in motion, the more than one image may be captured by more than one camera at the same time. In some embodiments, image acquisition unit 720 may be controlled by camera control module 440 or measurement module 450. In some embodiments, image acquisition unit 720 may acquire the one or more images from camera device 110 or a storage device disclosed elsewhere in the present disclosure (e.g., storage 130).

Correction unit 730 may be configured to correct the one or more images acquired by image acquisition unit 720 and generate one or more corrected images based on the one or more camera parameters and the one or more images acquired by image acquisition unit 720. In some embodiments, correction unit 730 may generate one or more corrected images in which vertical coordinates or horizontal coordinates of corresponding pixels in the image coordinate system are equal. As used herein, the corresponding pixels may refer to pixels in different images relating to a same point in the real world. For example, camera device 110 may be a binocular vision device including camera 1 and camera 2 illustrated in FIG. 2. Camera 1 and camera 2 may acquire a first image and a second image, respectively. Correction unit 730 may generate a first corrected image and a second corrected image in which vertical coordinates of corresponding pixels in the image coordinate system may be equal. As another example, camera device 110 may be a binocular vision device including camera 1 and camera 2 illustrated in FIG. 3-A or FIG. 3-B, horizontal coordinates of corresponding pixels in the image coordinate system in the first corrected image and the second corrected image may be equal. As used herein, in the image coordinate system, the origin may be a pixel in an image (e.g., a pixel in the highest position in the top left corner of the image). A horizontal coordinate axis of the image coordinate system may be a horizontal direction of the image. A vertical coordinate axis may be a vertical direction of the image. The horizontal coordinate axis of the image coordinate system may be parallel to the x axis of the camera coordinate system. The vertical coordinate axis of the image coordinate system may be parallel to the y axis of the camera coordinate system.

Parallax determination unit 740 may be configured to determine a parallax. As used herein, the parallax may refer to a displacement or a coordinate difference between corresponding pixels in different images in the image coordinate system. In some embodiments, if the parallax is determined based on the images acquired by image acquisition unit 720, the parallax may include both a parallax along a vertical direction (i.e., a vertical coordinate difference) and a parallax along a horizontal direction (i.e., a horizontal coordinate difference). If the parallax is determined based on the corrected images generated by correction unit 730, whereas vertical coordinates or horizontal coordinates of corresponding pixels in the corrected images in the image coordinate system may be equal, the parallax may include a parallax along the horizontal direction (i.e., the horizontal coordinate difference) or the vertical direction (i.e., the vertical coordinate difference). For example, camera device 110 may be a binocular vision device including camera 1 and camera 2 illustrated in FIG. 2, parallax determination unit 740 may determine a parallax along the horizontal direction between the first corrected image and the second corrected image. As another example, camera device 110 may be a binocular vision device including camera 1 and camera 2 illustrated in FIG. 3-A or FIG. 3-B, parallax determination unit 740 may determine a parallax along the vertical direction between the first corrected image and the second corrected image.

Outline determination unit 750 may be configured to determine an outline of the target. In some embodiments, outline determination unit 750 may determine the outline of the target in the first corrected image and/or in the second corrected image. In some embodiments, outline determination unit 750 may determine the outline of the target in the first image and/or the second image.

Dimension determination unit 760 may be configured to determine a dimension of the target based on the one or more camera parameters of the one or more cameras of camera device 110, the parallax, or the outline of the target. In some embodiments, the dimension of the target to be determined may include a length, a height, or a width of the target.

It should be noted that the above description of measurement module 450 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, correction unit 730 may be optional. As another example, acquisition unit 720 may be implemented in camera device 110, and the image(s) captured by camera device 110 may be transmitted to measurement module 450 via communication port 430.

Figure 8:
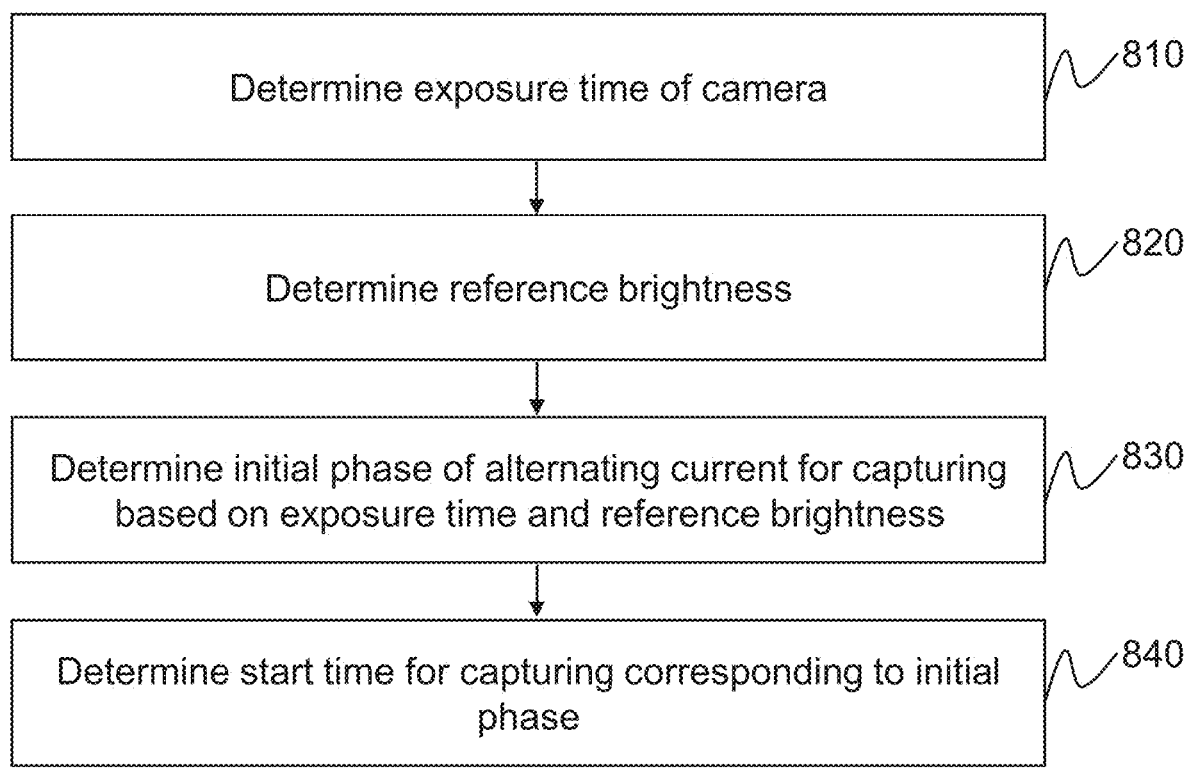
FIG. 8 is a flowchart illustrating an exemplary process for camera control according to some embodiments of the present disclosure.

FIG. 8 is a flowchart illustrating an exemplary process for camera control according to some embodiments of the present disclosure. In 810, exposure determination unit 510 may determine an exposure time of a camera (i.e., camera device 110 or part thereof). In some embodiments, exposure determination unit 510 may determine the exposure time based on the ambient brightness. For example, if the ambient brightness is low, the exposure time may be determined as a high value; if the ambient bright is high, the exposure time may be determined as a low value. In some embodiments, exposure determination unit 510 may determine an exposure time based on a parameter table. As used herein, a parameter table may refer to a lookup table showing one-to-one relationships between various ambient brightnesses and exposure times.

In 820, initial phase determination unit 520 may determine a reference brightness of a traffic light in a first reference image. In some embodiments, the reference brightness of a traffic light may be stored in initial phase determination unit 520 or any storage device disclosed elsewhere in the present disclosure. In some embodiments, the reference brightness of a traffic light may be a constant value. The constant value may be predetermined by imaging system 100 (e.g., computing device 120) or set by a user via computing device 120 or input/output 140. In some embodiments, the reference brightness of a traffic light may be adjusted based on an instruction from a user via, for example, computing device 120 or input/output 140.

In 830, initial phase determination unit 520 may determine an initial phase of an alternating current for capturing based on the exposure time and/or the reference brightness. Generally, a phase of an alternating current may change with time periodically as a sine wave. The phase of the alternating current may include positive phases and negative phases. At a time point at which the phase of the alternating current is minimum, the brightness of the traffic light may be lowest. Otherwise at a time point at which the phase of an alternating current is maximum, the brightness of the traffic light may be highest.

In some embodiments, for the brightness of the traffic light, functions of the positive phase and the negative phase of the alternating current may be the same, therefore the brightness of the traffic light may vary with time as modified sine wave (e.g., the modified sine wave illustrated in FIG. 10-B). In some embodiments, the brightness of the traffic light may be determined by an integral function. If integral time approaches to 0, the integral function may be expressed as formula (1):

$$K * \sin\left(\frac{2\pi}{T} * t\right) \approx K * \left(\frac{2\pi}{T}\right) * t \tag{1}$$

where T refers to a cycle time of an alternating current or capturing, t refers to an exposure time, and K refers to a preset constant.

In some embodiments, initial phase determination unit 520 may approximate the reference brightness by calculating an area of a trapezoid or a triangle encircled by an exposure time interval and a brightness curve according to formula (2):

$$B \approx \frac{K*\pi}{T}\int_{t_b}^{t_a} t dt \approx \frac{K*\pi}{T}(t_a^2 - t_b^2) \approx \frac{K*\pi}{T}(t_a + t_b)(t_a - t_b) \tag{2}$$

where B refers to the reference brightness, T refers to a cycle time of an alternating current for capturing, $(t_a - t_b)$ (denoted as $\Delta t$) refers to an exposure time.

In some embodiments, formula (2) may be modified as formula (3):

$$B = \frac{K*\pi}{T}(2t_b + \Delta t) * \Delta t \tag{3}$$

where $t_b$ refers to the initial phase of alternating current for capturing.

In some embodiments, initial phase determination unit 520 may determine the initial phase of the alternating current for capturing according to formula (3) based on the reference brightness and the exposure time.

In 840, capturing unit 530 may determine a starting time for capturing an image based on the initial phase. For example, in a waveform of an alternating current, a phase may correspond to a time, and capturing unit 530 may determine the starting time corresponding to the initial phase according the waveform of the alternating current. In some embodiments, the starting time may be transmitted to camera device 110, and camera device 110 may capture an image according to the determined starting time.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, 820 and 830 may be combined as a single step in which the initial phase of the alternating current for capturing may be determined based on the reference brightness.

Figure 9:
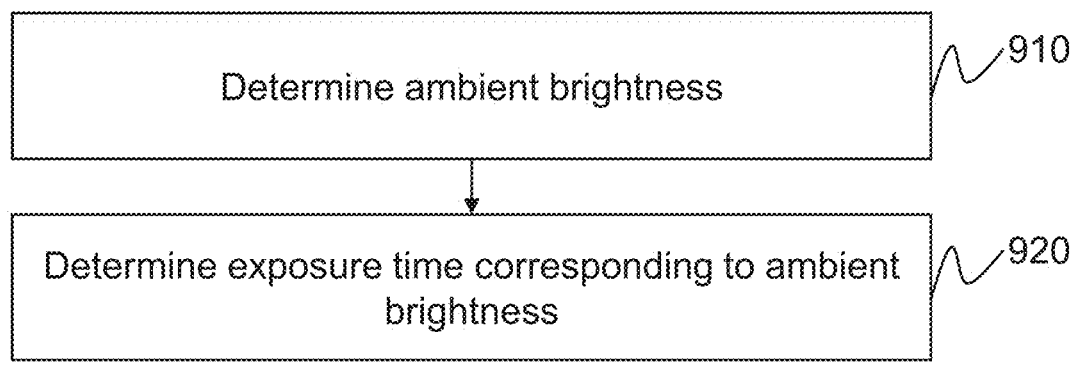
FIG. 9 is a flowchart illustrating an exemplary process for determining an exposure time according to some embodiments of the present disclosure.

FIG. 9 is a flowchart illustrating an exemplary process for determining an exposure time according to some embodiments of the present disclosure. In 910, ambient brightness determination block 610 may determine ambient brightness. In some embodiments, ambient brightness determination block 610 may determine the ambient brightness by analyzing a second reference image regarding an object in ambient environment acquired by camera device 110. The second reference image may include a plurality of pixels with different brightness values. The brightness values for the plurality of pixels may be analyzed and/or calculated, in order to determine the ambient brightness. For example, if the second reference image does not include the traffic light, ambient brightness determination block 610 may average the brightness values of pixels in the second reference image and may determine the ambient brightness. As another example, if the second reference image includes the traffic light, ambient brightness determination block 610 may remove pixels corresponding to the traffic light in the second reference image, and average brightness values of remaining pixels in the reference.

In some embodiments, ambient brightness determination block 610 may determine the ambient brightness by analyzing data collected by an optical sensor in camera device 110. The date collected by the optical sensor may include brightness information of ambient environment.

In 920, exposure time determination block 630 may determine an exposure time corresponding to the ambient brightness. In some embodiments, exposure time determination block 630 may determine the exposure time corresponding to the ambient time based on a relationship between ambient brightness and exposure time. For example, exposure time determination block 630 may determine the exposure time by searching a parameter table. The parameter table may be predetermined by imaging system 100 (e.g., computing device 120), or set by a user via computing device 120 or input/output 140, or adjusted based an instruction from a user via, for example, computing device 120 or input/output 140.

In some embodiments, in 920, exposure time determination block 630 may determine the exposure time based on historical data, default settings of imaging system 100, or an instruction from a user. For example, exposure time determination block 630 may receive an exposure time from a user (e.g., a traffic police) via computing device 120. In some embodiments, in 920, exposure time determination block 630 may determine a range of exposure time and may determine the minimum value in the range as the exposure time. For example, if the range of exposure time is from 1/250 seconds to 1/60 seconds, the minimum value 1/250 seconds may be used as the exposure time for capturing an image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the exposure time may be adjusted in real time according to the change of the ambient brightness. As another example, the exposure time may be set as a constant value when the ambient brightness is relatively stable.

FIG. 10-A is a schematic diagram illustrating an exemplary curve graph of an alternating current according to some embodiments of the present disclosure. A waveform of the alternating current may be expressed as a sine wave, wherein B represents a value of an alternating current, and t represents time.

FIG. 10-B is a schematic diagram illustrating an exemplary curve graph of a brightness of a traffic light according to some embodiments of the present disclosure. As illustrated in FIG. 10-B, the brightness of the traffic light may vary with time as modified sine wave, wherein B represents a brightness of a traffic light, and t represents time. In some embodiments, the brightness of the traffic light may be in direct proportion to the absolute value of the alternating current. When the absolute value of the alternating current is largest, the brightness of the traffic light may be highest, otherwise when the absolute value of the alternating current is smallest, the brightness of the traffic light may be lowest.

FIG. 11-A is a flowchart illustrating an exemplary process of determining a dimension of a target according to some embodiments of the present disclosure. In 1110, parameter determination unit 710 may determine one or more camera parameters of one or more cameras of camera device 110. In some embodiments, the one or more camera parameters may include an intrinsic parameter or an extrinsic parameter. The intrinsic parameter may include an optical parameter of the one or more cameras including, for example, a focal length, a principle point, a length of a baseline, a lens distortion parameter, or the like, or a combination thereof. The extrinsic parameter may include a pose and/or a position parameter of the one or more cameras including, for example, a pitch angle, a roll angle, a yaw angle, a height, or the like, or a combination thereof. In some embodiments, parameter determination unit 710 may determine the camera parameter by a camera calibration process. The process of camera calibration may include a method based on a reference object, a method of active vision, a method of camera self-calibration, or the like, or any combination thereof. By the method based on a reference object, parameter determination unit 710 may determine the camera parameter by means of a reference object with known structure, such as a calibration target, a calibration block, etc. The calibration target may include a pattern of a chess board, or a pattern of an array of filled circles. By the method of active vision, parameter determination unit 710 may determine the camera parameter based on the movement of the camera. The movement of the camera may include translational motion, or rotation along a certain axis. By the method of camera self-calibration, parameter determination unit 710 may determine the camera parameter based on images captured by the camera or the cameras.

Merely by way of example, for camera device 100 including camera 1 and camera 2, the camera parameters may include the focal lengths of camera 1 and camera 1 determined as 5594 millimeters, the principle point of the first image captured by camera 1 determined as (1223.814, 282.181), the principle point of the second image captured by camera 2 determined as (1223.814, 282.181), the length of the baseline determined as 0.5026 meters, the height of camera 1 and camera 2 determined as 7.5694 meters, and the pitch angle of camera 1 and camera 2 determined as 0.1257 degrees. In some embodiments, after the camera parameters are determined, parameter determination unit 710 may set a synchronous triggering signal S of camera 1 and camera 2 as FALSE (i.e., S=FALSE).

In 1140, image acquisition unit 720 may acquire a first image and a second image of the target. In some embodiments, the first image and the second image may be acquired from camera device 110 or a storage device disclosed elsewhere in the present disclosure (e.g., storage 130). For example, as illustrated in FIG. 14-A and FIG. 14-B, two images of a vehicle (i.e., the first and second images) are captured by camera device 110 simultaneously. In some embodiments, parameter determination unit 710 or camera device 110 may determine the set the synchronous triggering signal S of camera 1 and camera 2 as TRUE (i.e., S=TRUE).

In 1150, correction unit 730 may generate a first corrected image and a second corrected image by correcting the first image and the second image based on the one or more camera parameters. For example, an epipolar rectification may be performed. In some embodiments, the first image and the second image may be corrected such that, in the first corrected image and the second corrected image, vertical coordinates or horizontal coordinates of corresponding pixels in the image coordinate system are equal. For instance, camera device 110 may be a binocular vision device including camera 1 and camera 2 illustrated in FIG. 2, the vertical coordinates of two corresponding pixels in the first corrected image and the second corrected image may be equal. As another example, camera device 110 may be a binocular vision device including camera 1 and camera 2 illustrated in FIG. 3-A or FIG. 3-B, the horizontal coordinates of the two corresponding pixels in the first corrected image and the second corrected image may be equal. For example, as illustrated in FIG. 15-A and FIG. 15-B, two corrected images are generated. The vertical coordinates of corresponding pixels in the image coordinate system in the two images are equal.

In the first corrected image and the second corrected image, image processing may be transformed from a two-dimensional process to a one-dimensional process. For example, a parallax between two corresponding pixels in the first image and the second image may include both a parallax along a vertical direction and a parallax along a horizontal direction. A parallax between two corresponding pixels in the first corrected image and the second corrected image may include a parallax along a vertical direction or a parallax along a horizontal direction because horizontal or vertical coordinates of corresponding pixels in the first corrected image and the second corrected image in the image coordinate system are equal.

In 1160, parallax determination unit 740 may determine a parallax between a pixel in the first corrected image and a corresponding pixel in the second corrected image. In some embodiments, the method of determining the parallax may include a method based on a matching cost space, or the like. The parallax between two corresponding pixels in the first corrected image and the second corrected image may include a parallax along a vertical direction or a parallax along a horizontal direction. For example, camera device 110 may be a binocular vision device including camera 1 and camera 2 illustrated in FIG. 2, the parallax between two corresponding pixels in the first corrected image and the second corrected image may be a parallax along a horizontal direction. As another example, camera device 110 may be a binocular vision device including camera 1 and camera 2 illustrated in FIG. 3-A or FIG. 3-B, the parallax between two corresponding pixels in the first corrected image and the second corrected image may be a parallax along a vertical direction.

In 1170, outline determination unit 750 may determine an outline of the target. In some embodiments, the method of determining the outline of the target may include a method based on a confidence coefficient, a method based on stereo matching, a method based on edge detection algorithm, a method based on texture, a method based on color, a method based on image segmentation, or the like, or any combination thereof.

In 1180, dimension determination unit 760 may determine a dimension of the target based on the one or more camera parameters, the parallax, and/or the outline of the target.

In some embodiments, step 1160 may be performed before step 1170. Alternatively, step 1170 may be performed before step 1160. Alternatively, 1160 and 1170 may be performed at the same time. In some embodiments, the parallax may be determined based on the outline of the target. In some embodiments, the outline of the target may be determined based on the parallax. In some embodiments, the parallax and the outline of the target may be determined independently.

In some embodiments, event module 460 may generate an event based on the dimension of the target. The event may include a traffic violation, a traffic congestion, an accident, or the like, or any combination thereof.

It should be noted that the above description of the process of determining the dimension of the target is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, the correction step 1150 may be optional. As another example, one or more other optional steps may be added between step 1160 and step 1170, or elsewhere in the exemplary process illustrated in FIG. 11-A. Examples of such steps may include storing or caching the acquired information.

FIG. 11-B is a flowchart illustrating an exemplary process of acquiring a first image and a second image of a target according to some embodiments of the present disclosure. In 1141, image acquisition unit 720 may obtain one or more preliminary images captured by the one or more cameras of camera device 110. For example, for a binocular vision device including camera 1 and camera 2 illustrated in FIG. 2, two preliminary images may be obtained. In some embodiments, the preliminary image may be used to identify an object and determine a target based on the object. For example, in a traffic system, the preliminary images may be extracted from a real-time supervising video of vehicles.

In 1143, image acquisition unit 720 may identify an object based on the one or more preliminary images. The object may include a vehicle, a boat, a flying machine, a package, a baggage, a person, a bicycle, a tricycle, etc.

In 1145, image acquisition unit 720 may determine a target based on the identified object. Image acquisition unit 720 may determine whether the object is the target or not. If so, image acquisition unit 720 may determine the object as the target; if not, image acquisition unit 720 may continue to identify another object. For example, image acquisition unit 720 may determine whether the object is a vehicle or not. In some embodiments, if image acquisition unit 720 determines that the object is not the target, image acquisition unit 720 may update a background model and continue to identify another object.

In some embodiments, image acquisition unit 720 may determine the target by identifying one or more features of the target. For example, image acquisition unit 720 may determine whether there is a license plate on the object. If so, image acquisition unit 720 may determine the object as the target; if not, image acquisition unit 720 may continue to identify another object. The method of determining the license plate may include a plate detection method, or the like.

In 1147, image acquisition unit 720 may transmit a capturing instruction to camera device 110. As used herein, the capturing instruction may refer to that a target has been determined and a capturing can be performed. For example, camera device 110 may be a binocular vision device including camera 1 and camera 2 illustrated in FIG. 2, FIG. 3-A, or FIG. 3-B, if the target is still, a first image and a second image may be captured by camera 1 and camera 2, or one camera moved between two different positions. If the target is in motion, the first image and the second image may be captured by camera 1 and camera 2 at the same time. As another example, camera device 110 may be a multi-nocular vision device including more than two cameras, the first image may be captured by a selected camera, and the second image may be captured by any one of the other cameras of which the target is in a view.

In 1149, acquisition unit 720 may acquire the first image and the second image of the target captured by camera device 110. The acquired first image and second image may be further corrected or analyzed by performing one or more steps illustrated in FIG. 11-A and described above.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, steps 1141-1147 may be performed by camera device 110. Acquisition unit 720 may acquire the first image and the second image of the target from camera device 110 directly.

Figure 12:
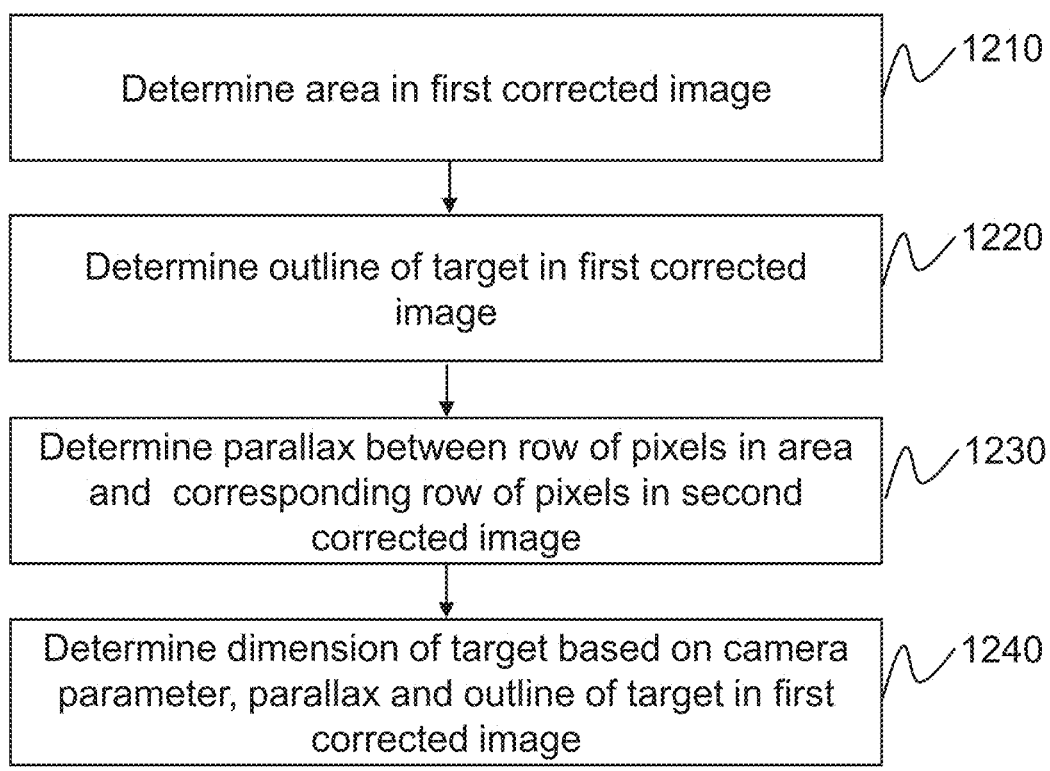
FIG. 12 is a flowchart illustrating an exemplary process of determining a dimension of a target according to some embodiments of the present disclosure.

FIG. 12 is a flowchart illustrating an exemplary process of determining a dimension of the target according to some embodiments of the present disclosure. For purpose of illustration, the process of determining the dimension of the target described in FIG. 12 may be performed with the configuration of the cameras illustrated in FIG. 2. For the configurations of the cameras illustrated in FIG. 3-A or FIG. 3-B, the process of determining the dimension of the target may be performed by exchanging the vertical coordinates with the horizontal coordinates in the process described in FIG. 12.

In 1210, parallax determination unit 740 or outline determination unit 750 may determine an area in the first corrected image. In some embodiments, the method of generating the first corrected image and the second corrected image described in step 1150 of FIG. 11 may be applied to FIG. 12. In some embodiments, the area may include the target. In some embodiments, determining the area first may reduce complexity and/or increase efficiency of the process of determining the dimension of the target. In some embodiments, determining the area may be optional.

In some embodiments, the process of determining the area may include determining coordinate information in the image coordinate system of one or more features of the target in the first corrected image. The process of determining the area may also include determining the area in the first corrected image based on the coordinate information. For example, parallax determination unit 740 or outline determination unit 750 may determine coordinate information in the image coordinate system of a license plate in the first corrected image, and determine the area in the first corrected image based on the coordinate information of the license plate. In some embodiments, parallax determination unit 740 or outline determination unit 750 may apply a motion detection algorithm. The motion detection algorithm may include a method based on background filtration.

In 1220, outline determination unit 750 may determine an outline of the target in the first corrected image. In some embodiments, outline determination unit 750 may determine the outline of the target in the first corrected image based on a confidence coefficient of each pixel in the area. In some embodiments, the confidence coefficient of each pixel may be determined based on a matching cost space $G_{U-V-D}$. As used herein, the matching cost space $G_{U-V-D}$ may refer to a space including a plurality of matching costs of pixels (u, v) in the area, herein a parallax between a pixel (u, v) in the area in the first corrected image and a corresponding pixel in the second corrected image is d (the value of d is equal to or larger than 0).

In some embodiments, the matching cost of a pixel may be determined based on coordinate information of pixels in the area in the first corrected image and corresponding pixels in the second corrected image. The coordinate information of pixels may be determined based on the parallax(s). For example, a pixel in the area in the first corrected image may be referred to as $p_1(u_1,v_1)$, a principle point of the first corrected image may be referred to as $p_{01}(u_{01},v_{01})$, a corresponding pixel in the second corrected image may be referred to as $p_2(u_2,v_2)$, a principle point of the second corrected image may be referred to as $p_{02}(u_{02},v_{02})$. Referring back to FIG. 2, for example, camera 1 may acquire the first image, and camera 2 may acquire the second image. $u_1$, $v_1$, $u_2$ and $v_2$ may satisfy formula (4) and formula (5) below:

$$u_2 = u_1 - d + u_{02} - u_{01}, \quad (4)$$

$$v_1 = v_2. \quad (5)$$

As another example, camera 1 may acquire the second image and camera 2 may acquire the first image. $u_1$, $v_1$, $u_2$ and $v_2$ may satisfy formula (6) and formula (5):

$$u_2 = u_1 - d + u_{02} - u_{01}, \quad (6)$$

In some embodiment, the matching cost may be determined based on a method of sum of squared differences (SSD), a method of sum of absolute differences (SAD), a method of normalized cross-correlation (NCC), or the like, or any combination thereof.

In some embodiments, the confidence coefficient may be determined based on the matching cost according to formula (7) below:

$$B(i,j) = \min\{\Sigma_{k=W_s}{}^i c(k,j,d_g(j)), \Sigma_{k=i}{}^{W_e} c(k,j,d_g(j))\}, \quad (7)$$

where B(i,j) refers to the confidence coefficient of a pixel p(i,j) in the area, $W_s$ refers to a minimum value among horizontal coordinates of pixels in the area in the image coordinate system, $W_e$ refers to a maximum value among horizontal coordinates of pixels in the area in the image coordinate system, k refers to a horizontal coordinate of a pixel of which the vertical coordinate may be similar to the pixel p(i,j), $d_g(j)$ refers to a relationship between the parallax and the vertical coordinates, $c(k,j,d_g(j))$ refers to a matching cost.

Figure 16:
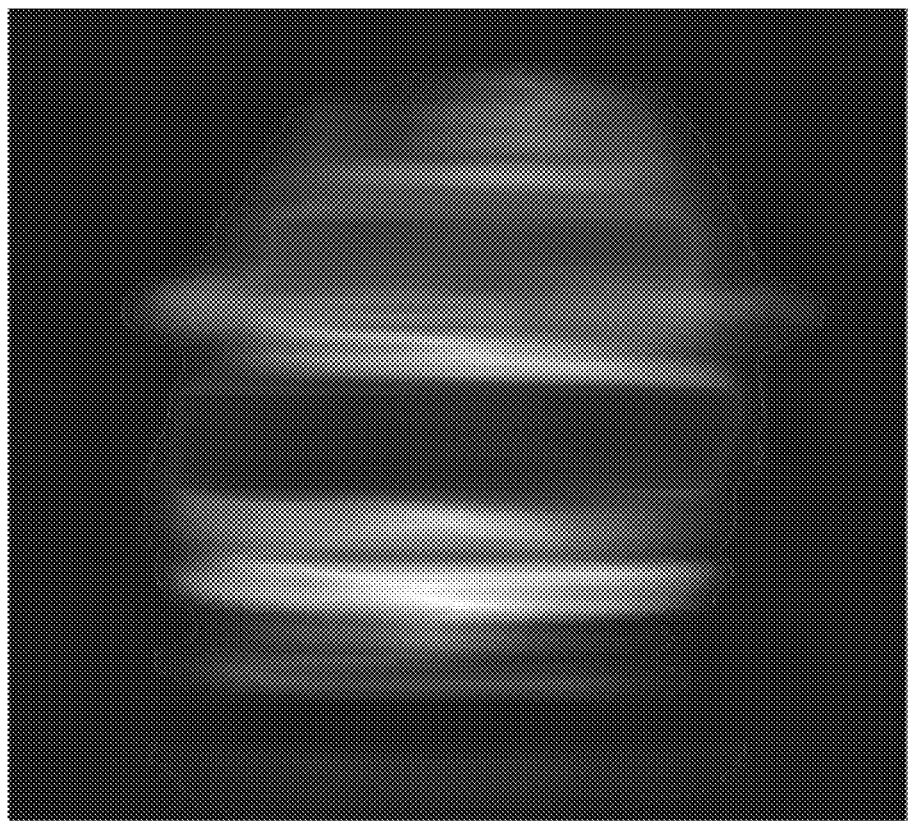
FIG. 16 illustrates an exemplary image showing an outline of a vehicle according to some embodiments of the present disclosure.

In some embodiments, a left edge pixel and a right edge pixel of a row of pixels in the area may be determined according to formula (8) and formula (9) below, respectively:

$$U_{vl}(j) = \operatorname*{argmin}_i \{B(i, j) > th_1\}, \quad (8)$$

$$U_{vr}(j) = \operatorname*{argmin}_i \{B(i, j) > th_1\}, \quad (9)$$

where $U_{vl}(j)$ refers to the left edge pixel of the row of pixels, $U_{vr}(j)$ refers to a right edge pixel of the row of pixels, $th_1$ refers to a first threshold. In some embodiments, $th_1$ may be 800. In some embodiments, the left edge pixel and the right edge pixel of a row may be referred as edge pixels of the row. The outline of the target in the area may be determined based on the edge pixels of each row in the area. FIG. 16 illustrated the outline of a vehicle determined based on the exemplary process described above.

In 1230, parallax determination unit 740 may determine a parallax between a row of pixels in the area and the corresponding row of pixels in the second corrected image. In some embodiments, the parallax may be determined based on the matching cost space $G_{U-V-D}$.

In some embodiments, parallax determination unit 740 may determine a V-D space $G_{V-D}$ by modifying the matching cost space $G_{U-V-D}$. For example, parallax determination unit 740 may determine the V-D space $G_{V-D}$ by compressing the matching cost space $G_{U-V-D}$ based on each row of pixels in the area that satisfies a certain condition. In some embodiments, the certain condition may include a condition in which a distance between the left edge pixel and the right edge pixel of a row of pixels is larger than or equal to a second threshold. The V-D space $G_{V-D}$ may include one or more average matching costs when the parallax between the row of pixels in the area and the corresponding row of pixels in the second corrected image is d. As used herein, "each row of pixels" in the area may include edge pixels (including the left edge pixel and the right edge pixel) of the row and pixels located between the edge pixels of the row.

In some embodiments, the parallax between a row of pixels in the area and the corresponding row of pixels in the second corrected image may be determined based on formula (10) below:

$$d_v^*(j) = \arg\min_d \{i_{v-d}(d, j) + S_s(d_v(j), d_v(j+1))\}, \quad (10)$$

where, $$S_s(d_v(j), d_v(j+1)) = \begin{cases} 0, & |d_v(j) - d_v(j+1)| \le th_3 \\ th_4, & |d_v(j) - d_v(j+1)| > th_3 \end{cases}, \quad (11)$$

where $d_v^*(j)$ refers to the parallax between a row of pixels in the area and the corresponding row of pixels in the second corrected image, $i_{v-d}(d,j)$ refers to the average matching cost in the V-D space, $S_s(d_v(j),d_v(j+1))$ refers to a smooth element configured to measure a degree of variation between two parallaxes corresponding to two adjacent rows (e.g., the row j and the row j+1) in the area and make a curve of parallax smooth, $th_3$ refers to a third threshold, and $th_4$ refers to a fourth threshold. $I_{v-d}(d,j)$ may be defined as formula (12) below:

$$I_{v-d}(d,j) = \Sigma_{k=U_{vl}(j)}^{U_{vr}(j)} c(k,j,i). \quad (12)$$

Figure 18:
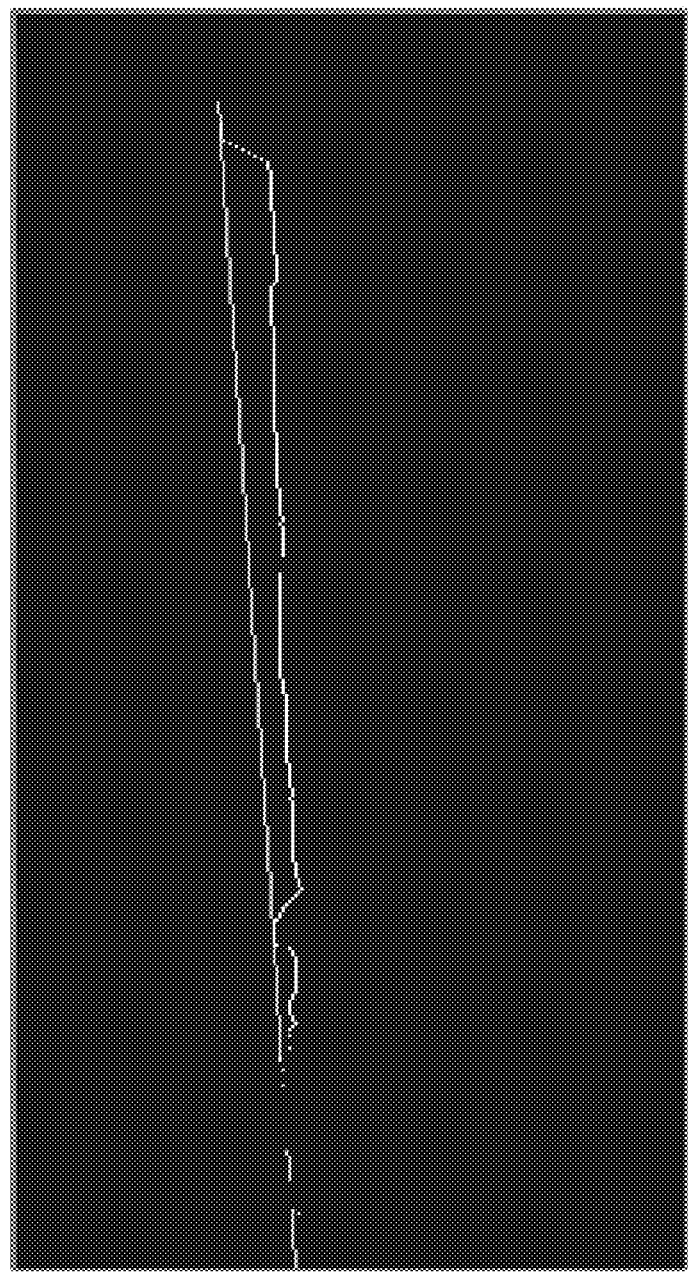
FIG. 18 illustrates an exemplary image showing an exemplary curve of the parallax in the area of the target and a straight line of the parallax in the area of the reference plane according to some embodiments of the present disclosure.

In some embodiments, the external surface of the target may be smooth, so according to formula (11), when the difference of the two parallaxes between two adjacent rows (e.g., the row j and the row j+1) in the area is less than or equal to the third threshold $th_3$, the smooth element may be 0. When the difference of the parallaxes between two adjacent rows (e.g., the row j and the row j+1) in the area is larger than the third threshold $th_3$, the smooth element may be equal to the fourth threshold $th_4$. In some embodiments, the matching costs in $I_{v-d}(d,j)$ may be normalized to 0~255, and the fourth threshold $th_4$ may be 50, which may make the curve of parallax $d_v*(j)$ smooth. For example, as illustrated in FIG. 18, a straight line of the parallax and a curve of the parallax were determined.

In some embodiments, parallax determination unit 740 may determine a V-D image $I_{V-D}$ according to formula (12). In some embodiments, the V-D image $I_{V-D}$ may be normalized, and a grey image in which grey level varies among 0~255 may be generated.

In 1240, dimension determination unit 760 may determine a dimension of the target based on the camera parameters, the outline of the target in the first corrected image, and the parallax between a row of pixels in the area and corresponding row of pixels in the second corrected image. In some embodiments, the dimension of the target may include a dimension in the camera coordinate system, or a dimension in the world coordinate system.

For example, the coordinates of the edge pixels of a row and a width of a row in the area in the camera coordinate system may be determined based on formulas (13)-(15) below:

$$W_{cj} = \frac{B(U_{vr}(j) - U_{vl}(j))}{d_v^*(j)}, \quad (13)$$

$$y_{cj} = \frac{B(j - v_{01})}{d_v^*(j)}, \quad (14)$$

$$z_{cj} = \frac{Bf}{d_v^*(j)}, \quad (15)$$

where $W_{cj}$ refers to the width of a row in the area, $y_{cj}$ and $z_{cj}$ refers to the coordinates of the edge pixels of a row in the camera coordinate system, j refers to the number of a row, B refers to the baseline of the cameras used for capturing the first image and the second image, $v_{01}$ refers to the vertical coordinate of the principle point in the first corrected image, and f refers to the focal length of the cameras used for capturing the first image and the second image.

In some embodiments, $y_{cj}$ and $z_{cj}$ may be transformed from the camera coordinate system to the world coordinate system based on the height and the pitch angle of the cameras used for capturing the first image and the second image by using formula (16) and formula (17) below:

$$y_{wj} = \cos\theta \times y_{cj} + \sin\theta \times z_{cj} - h_c, \quad (16)$$

$$z_{wj} = \sin\theta \times y_{cj} + \cos\theta \times z_{cj}, \quad (17)$$

where $y_{wj}$ and $z_{wj}$ refers to the coordinates of the edge pixels of a row in the world coordinate system, θ refers to the pitch angle of the cameras, $h_c$ refers to the height of the cameras.

The length, the width, and the height of the target may be determined based on formulas (18)-(20) below:

$$L_V = \max_j\{z_{wj}\} - \min_j\{z_{wj}\}, \quad (18)$$

$$W_V = \max_j\{W_{cj}\}, \quad (19)$$

$$H_V = \max_j\{y_{wj}\}, \quad (20)$$

In some embodiments, step 1220 may be performed before step 1230, and step 1230 may be performed before 1220. Alternatively, 1220 and 1230 may be performed at the same time. In some embodiments, the parallax may be determined based on the outline of the target. In some embodiments, the outline of the target may be determined based on the determined parallax. In some embodiments, the parallax and the outline of the target may be determined independently.

It should be noted that the above description of the process of determining the dimension of the target is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, step 1210 may be optional. In some embodiments, step 1150 may be performed before step 1210, alternatively step 1210 may be performed before step 1150. In some embodiments, the outline of the target or the parallax may be determined based on the first image and the second image instead of the first corrected image and the second corrected image.

Figure 13:
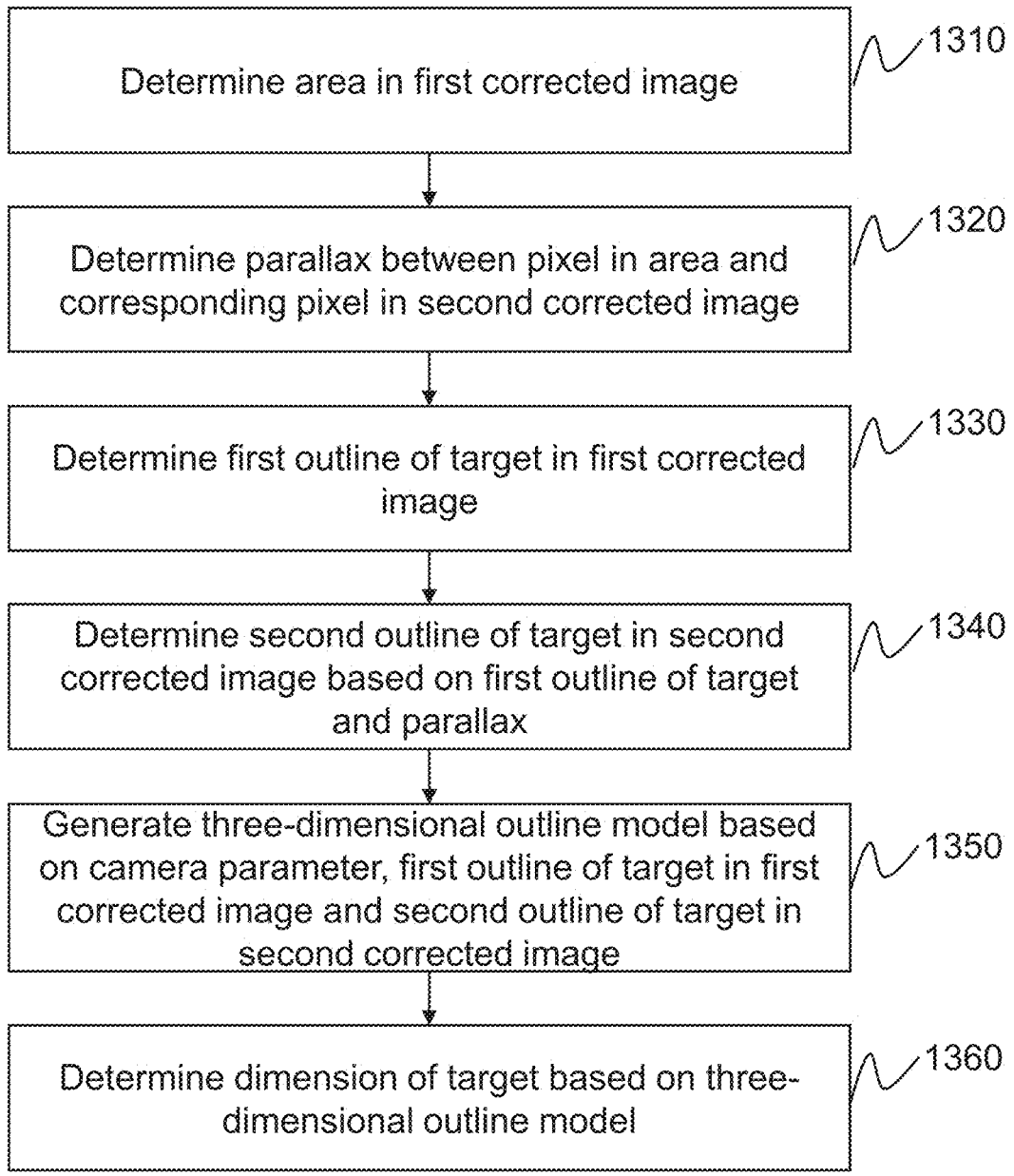
FIG. 13 is a flowchart illustrating another exemplary process of determining a dimension of a target according to some embodiments of the present disclosure.

FIG. 13 is a flowchart illustrating another exemplary process of determining a dimension of the target according to some embodiments of the present disclosure. For purpose of illustration, the process of determining the dimension of the target described in FIG. 13 may be performed with the configuration of the cameras illustrated in FIG. 2. For the configurations of the cameras illustrated in FIG. 3-A or FIG. 3-B, the process of determining the dimension of the target may be performed by exchanging the vertical coordinates with the horizontal coordinates in the process described in FIG. 13.

In 1310, parallax determination unit 740 may determine an area in the first corrected image. In some embodiments, the method of generating the first corrected image and the second corrected image described in 1150 of FIG. 11 may be applied to FIG. 13. In some embodiments, the area may include the target. In some embodiments, determining the area first may reduce complexity and/or increase efficiency of the process for determining the dimension of the target. In some embodiments, determining the area may be optional.

In some embodiments, the process of determining the area may include determining a dynamic foreground in the first corrected image. The process of determining the area may further include determining the area in the first corrected image based on the dynamic foreground. In some embodiments, parallax determination unit 740 may determine the dynamic foreground by separating the static background and the dynamic foreground. The method of determining the dynamic foreground may include a method of optical flow, a method of background modeling, a method of frame difference, a method of background subtraction, an edge detection method, or the like, or any combination thereof. In some embodiments, the method of determining the area in the first corrected image described in step 1310 may be applied to step 1210 of FIG. 12. In some embodiments, the method of determining the area in the first corrected image described in step 1210 may be applied to step 1310 of FIG. 13.

In 1320, parallax determination unit 740 may determine a parallax between a pixel in the area and a corresponding pixel in the second corrected image. In some embodiments, the method of determining the parallax described in step 1230 of FIG. 12 may be applied to step 1320.

In 1330, outline determination unit 750 may determine a first outline of the target in the first corrected image. In some embodiments, the method of determining the first outline of the target may include an edge detection method, a method based on texture, a method based on color, a method based on image segmentation, or the like, or any combination thereof. For the edge detection method, the process may include determining a response value of each pixel in the area by performing an edge fitting, and determining the first outline of the target based on pixels of which the response values are larger than a fifth threshold. In some embodiments, the method of determining the outline of the target in the first corrected image described in step 1330 may be applied to step 1220 of FIG. 12. In some embodiments, the method of determining the outline of the target in the first corrected image described in step 1220 may be applied to step 1330 of FIG. 13.

In 1340, outline determination unit 750 may determine a second outline of the target in the second corrected image based on the first ° utile of the target and the parallax. In some embodiments, the second outline of the target may be determined based on a stereo matching method. The method may include determining a matching cost of a pixel in the first outline of the target based on the parallax, determining a matching pixel in the second corrected image corresponding to the pixel in the first outline, and determining the second outline of the target in the second corrected image based on the matching pixels.

For example, camera device 110 may be a binocular vision device including camera 1 and camera 2 illustrated in FIG. 2. Camera device 110 may acquire a first image and a second image by camera 1 and camera 2, respectively. A pixel in the first outline of the target may be referred to as $p_{L1}(u_{L1},v_{L1})$, a matching pixel in the second corrected image may be referred to as $p_{L2}(u_{L2},v_{L2})$, and the matching cost may be referred to as $c(u_{L2},v_{L2},d)$, where $u_{L1}$, $v_{L1}$, $u_{L2}$, and $v_{L2}$ may satisfy formula (21) and formula (22) below:

$$u_{L2}=u_{L1}+d, \tag{21}$$

$$v_{L1}=v_{L2}. \tag{22}$$

In some embodiments, the matching cost may be determined based on a method of sum of squared differences (SSD), a method of sum of absolute differences (SAD), a method of normalized cross-correlation (NCC), or the like, or any combination thereof. For example, the matching cost may be determined based on the method of sum of absolute differences (SAD) according to formula (23) below:

$$c(u_{L2},v_{L2},d)=\Sigma_{j=v_{L2}-W}^{v_{L2}+W}\Sigma_{i=u_{L2}-W}^{u_{L2}+W}|p_{L1}(i-d,j)-p_{L2}(i,j)|, \tag{23}$$

where W refers to a size of a matching window. In some embodiments, W may be 6. A superior matching pixel $p_{m1}(u_{L1}+d_1^*,v_{L1})$ may be determined in the second corrected image. $d_1^*$ may satisfy formula (24) below:

$$d_1^* = \underset{d}{\operatorname{argmin}} c(u_{L1} + d, v_{L1}, d). \tag{24}$$

A secondary matching pixel $p_{m2}(u_{L1}+d_2^*,v_{L1})$ may be determined in the second corrected image. If $c(u_{L1}+d_1^*,v_{L1},d_1^*)/c(u_{L1}+d_2^*,v_{L1},d_2^*) \leq th_6$, the superior matching pixel may be accepted as the matching pixel, where $th_6$ refers to a sixth threshold. If $c(u_{L1}+d_1^*,v_{L1},d_1^*)/c(u_{L1}+d_2^*,v_{L1},d_2^*) > th_6$, another superior matching pixel and anther secondary matching pixel may be determined. The second outline of the target may be determined based on the accepted matching pixels.

In 1350, dimension determination unit 760 may generate a 3D outline model based on the camera parameters, the parallax, the first outline of the target, and the second outline of the target. In some embodiments, dimension determination unit 760 may generate a 3D outline model of the camera coordinate system based on the parallax, the first outline of the target and the second outline of the target, and/or may convert the three-dimensional outline of the camera coordinate system to a 3D outline model of the world coordinate system based on the camera parameters.

For example, a sub-pixel of the matching pixel may be determined based on the matching pixel $p_{m1}(u_{L1}+d_1^*,v_{L1})$. The sub-pixel may be referred to as $P_{m3}(u_{L1}+d^s,v_{L1})$. The 3D coordinates in the camera coordinate system of the pixel $p_{L1}$ may be determined based on formulas (25)-(27) below:

$$x_{cp} = \frac{B(u_{L1} - u_{02})}{d^s}, \tag{25}$$

$$y_{cp} = \frac{B(v_{L1} - v_{02})}{d^s}, \tag{26}$$

$$z_{cp} = \frac{Bf}{d^s}, \tag{27}$$

where $x_{cp}$, $y_{cp}$, and $z_{cp}$ refers to the three-dimensional coordinates in the camera coordinate system of the pixel $p_{L1}$, $d^s$ refers to a parallax between the sub-pixel and the pixel $p_{L1}$, B refers to the baseline of the cameras used for capturing the first image and the second image (e.g., camera 1 and camera 2), $v_{02}$ refers to the vertical coordinate of the principle point in the first corrected image, $u_{02}$ refers to the horizontal coordinate of the principle point in the first corrected image, and f refers to the focal length of the cameras used for capturing the first image and the second image (e.g., camera 1 and camera 2).

The 3D coordinates in the world coordinate system of the pixel $p_{L1}$ may be determined based on the height and the pitch angel of the cameras used for capturing the first image and the second image (e.g., camera 1 and camera 2) according to formulas (28)-(30) below:

$$x_{wp}=x_{cp}, \tag{28}$$

$$y_{wp}=\cos\theta \times y_{cp}+\sin\theta \times z_{cp}-h_c, \tag{29}$$

$$z_{wp}=\sin\theta \times y_{cp}+\cos\theta \times z_{cp}, \tag{30}$$

where $x_{wp}$, $y_{wp}$, and $z_{wp}$ refers to the three-dimensional coordinates in the world coordinate system of the pixel $p_{L1}$, θ refers to the pitch angle of the cameras, and $h_c$ refers to the height of the cameras.

In some embodiments, the 3D coordinates in the world coordinate system of the other pixels in the first outline of the target may be determined in the same way as the pixel $p_{L1}$.

In 1360, dimension determination unit 760 may determine a dimension of the target based on the 3D outline model. In some embodiments, the dimension may be obtained by determining a distribution of pixels in the world coordinate system in the 3D outline model. In some embodiments, the method of determining the distribution may include a method based on a histogram, a method based on fitting, a region growing method based on seed points, or the like, or any combination thereof.

For example, for the method based on a histogram, the histogram may be used to determine a point cloud distribution in the world coordinate system along the directions of the three coordinate axes. For the direction of the z axis of the world coordinate system, the z axis may be divided into a plurality of parts. A part of the z axis is referred to as a bin $B_k$. The length of a bin is referred to as $\Delta S_z$. The unit for $\Delta S_z$ is meter. The total number of the bins is referred to as $M_z$. The number of the point cloud in a bin is referred to as $n_k$. k refers to a sequence number of a bin and $k \in [0, M_z)$.

In some embodiments, dimension determination unit 760 may preprocess the histogram according to formula (31) below to reduce noise:

$$\{\dot{B}_k\} = \left\{ B_k \mid n_k > th_7, \frac{n_k}{N} > th_8 \right\}, \quad (31)$$

where $\{\dot{B}_k\}$ refers to a group of bins that may be preprocessed to remove or reduce noise, $th_7$ and $th_8$ refers to a seventh threshold and an eighth threshold, and N refers to the number of the pixels processed by the histogram to determine the dimension of the target. In some embodiments, $th_7 \in [20 \times \Delta S_z, 200 \times \Delta S_z]$, $th_8 \in [0.05 \times \Delta S_z, 0.3 \times \Delta S_z]$.

In some embodiments, an initial element may be a bin belong to any part of the target (e.g., a license plate of a vehicle). The initial element may be taken as an origin of the method of determining the dimension of the target. If a minimum distance between a bin and a group of bins belonging to the target which may be referred to as $\{\ddot{B}_k\}$ is less than a ninth threshold, the bin may be regarded as a bin belonging to the target (e.g., the vehicle). The length of the target (e.g., the vehicle) may be determined according to formula (32) below:

$$L_v = \Delta S_z^* (k_{max}^z - k_{min}^z), \quad (32)$$

where $L_v$ refers to the length of the target, $k_{max}^z$ refers to a maximum value of k in $\{\ddot{B}_k\}$, $k_{min}^z$ refers to a minimum value of k in $\{\ddot{B}_k\}$. The width and the height of the target may be determined based on formula (33) and formula (34) below, in the same way as the length of the target:

$$W_v = \Delta S_x^* (k_{max}^x - k_{min}^x), \quad (33)$$

$$H_v = \Delta S_x^* k_{max}^y. \quad (34)$$

Figure 20:
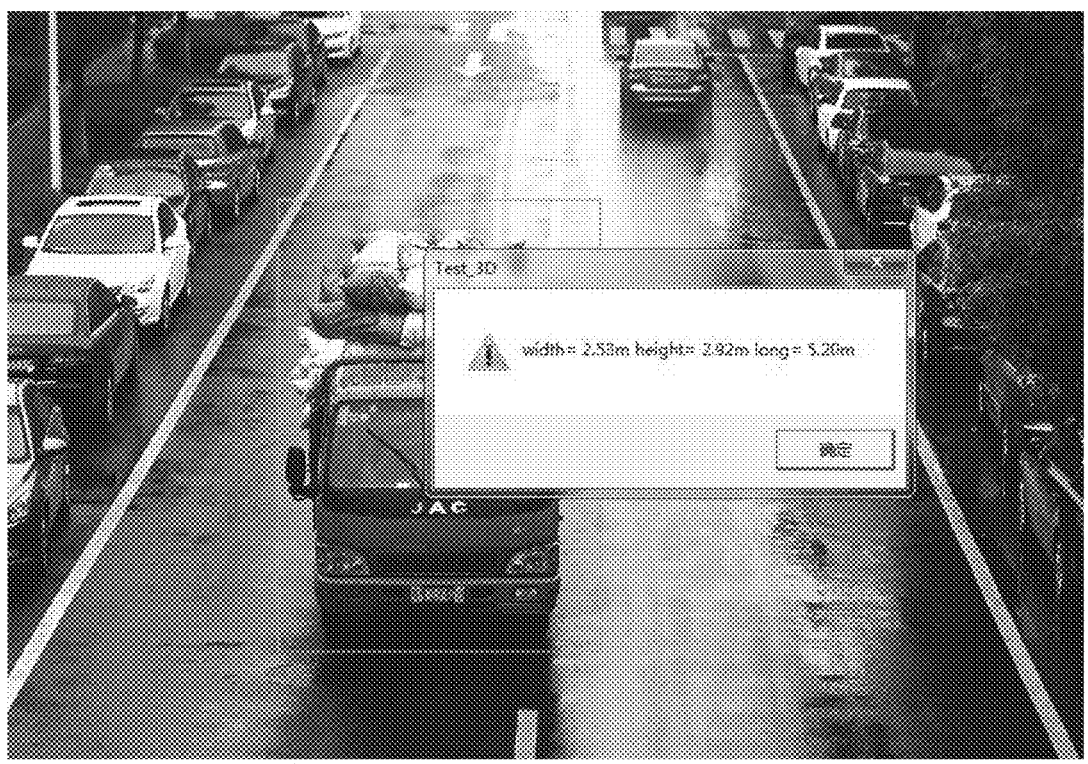
FIG. 20 illustrates an exemplary image showing an exemplary result of the dimension of a vehicle according to some embodiments of the present disclosure.

For example, FIG. 19-A through FIG. 19-C illustrate exemplary histograms determined based on the methods described above. FIG. 20 illustrates an exemplary dimension of a vehicle determined based on the method described above.

It should be noted that the above description of the process of determining the dimension of the target is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, step 1310 may be optional. In some embodiments, step 1150 may be performed before step 1310, alternatively, step 1310 may be performed before step 1150. In some embodiments, the outline of the target or the parallax may be determined based on the first image and the second image instead of the first corrected image and the second corrected image. In some embodiments, step 1320 may be performed before step 1330, step 1330 may be performed before step 1320. Alternatively, step 1320 and step 1330 may be performed at the same time.

In some embodiments, the thresholds (e.g., the first threshold, the second threshold, or the like) mentioned in this disclosure may be obtained based on historical data, default settings of the imaging system 100, or an instruction from a user.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

EXAMPLES

The examples are provided for illustrated purposes and not intended to limit the scope of the present disclosure.

Example 1

FIG. 14-A and FIG. 14-B illustrate two exemplary images captured by the cameras of camera device 110 according to some embodiments of the present disclosure. As illustrated in FIG. 14-A and FIG. 14-B, a first image and a second image of a vehicle were acquired. It may be seen that there is a parallax between any pixel in the first image and a corresponding pixel in the second image.

Example 2

FIG. 15-A and FIG. 15-B illustrate two exemplary corrected images according to some embodiments of the present disclosure. As illustrated in FIG. 15-A and FIG. 15-B, a first corrected image and a second corrected image were generated. The vertical coordinates of corresponding pixels in the image coordinate system in the first corrected image and the second corrected image were equal.

Example 3

FIG. 16 illustrates an exemplary image showing an outline of a vehicle according to some embodiments of the present disclosure. More detailed descriptions regarding the determination of the outline may be found in FIG. 12 (e.g., 1230).

Example 4

Figure 17:
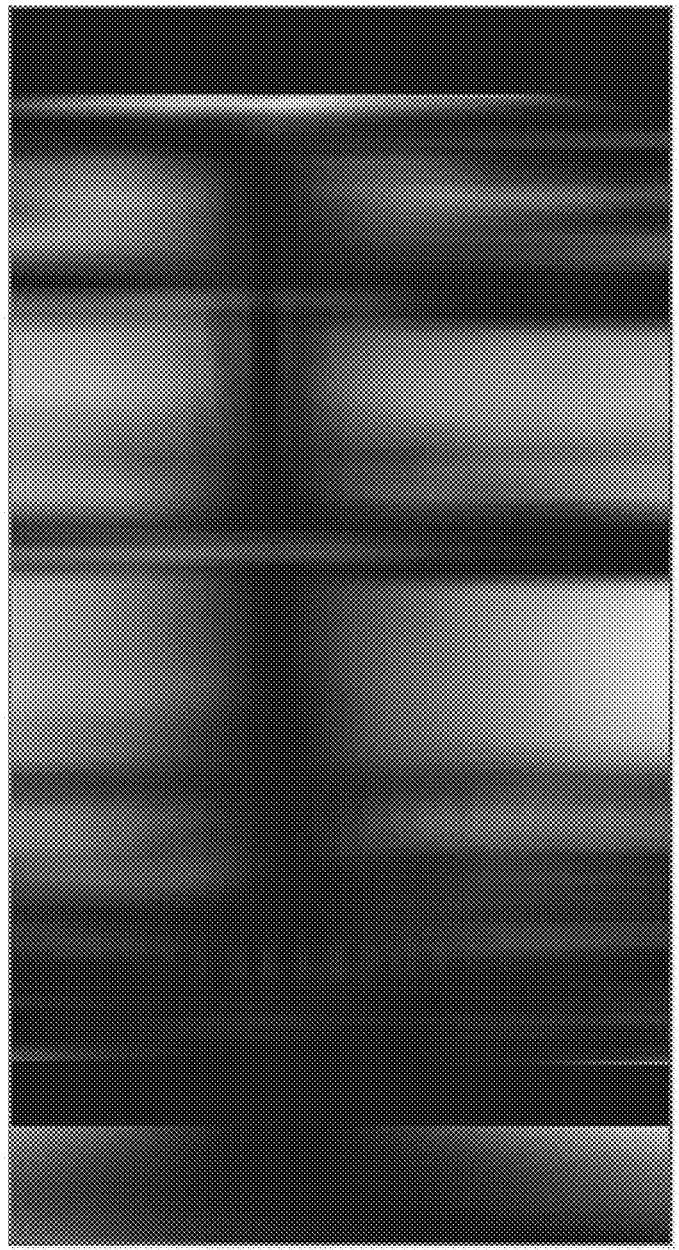
FIG. 17 illustrates an exemplary V-D image according to some embodiments of the present disclosure.

FIG. 17 illustrates an exemplary V-D image according to some embodiments of the present disclosure. More detailed descriptions relating to determining the V-D image may be found in this application elsewhere.

Example 5

FIG. 18 illustrates an exemplary image showing a curve of the parallax in the area of the target and a straight line of the parallax in the area of the reference plane according to some embodiments of the present disclosure. As illustrated in FIG. 18, the left line is the straight line of the parallax in the area of the reference plane. The right line is the curve line of the parallax in the area of the target.

Example 6

FIG. 19-A illustrates an exemplary image showing a histogram of the z axis of a point cloud distribution according to some embodiments of the present disclosure. FIG. 19-B illustrates an exemplary image showing a histogram of the x axis of the point cloud distribution according to some embodiments of the present disclosure. FIG. 19-C illustrates an exemplary image showing a histogram of the y axis of the point cloud distribution according to some embodiments of the present disclosure. The histogram of the z axis is used to determine the length of the target. As illustrated in FIG. 19-A, frame a represents the edge of the length. The histogram of the x axis is used to determine the width of the target. As illustrated in FIG. 19-B, frame b represents the edge of the width. The histogram of the y axis is used to determine the height of the target. As illustrated in FIG. 19-C, c represents the highest point of the target. More detailed descriptions regarding the determination of the dimension of the target may be found in FIG. 13 (e.g., 1360).

Example 7

FIG. 20 illustrates an exemplary image showing a result of the dimension of a vehicle according to some embodiments of the present disclosure. As illustrated in FIG. 20, the width of the vehicle is 2.53 meters, the height of the vehicle is 2.92 meters, and the length of the vehicle is 5.20 meters.

We claim:

1. A method for determining a dimension of a target, the method comprising:
   determining a camera parameter, the camera parameter including at least one of a focal length, a yaw angle, a roll angle, a pitch angle, or a height of one or more cameras;
   acquiring a first image and a second image of a target captured by the one or more cameras;
   generating a first corrected image and a second corrected image by correcting the first image and the second image, wherein vertical coordinates or horizontal coordinates of corresponding pixels in the first corrected image and the second corrected image in image coordinate system are equal;
   determining an area in the first corrected image; and
   determining a first outline of the target in the first corrected image based on the area;
   determining a parallax between a pixel in the first corrected image and a corresponding pixel in the second corrected image;
   determining an outline of the target; and
   determining a dimension of the target based at least in part on the camera parameter, the parallax, and the outline of the target;
   wherein determining the parallax between the pixel in the first corrected image and the corresponding pixel in the second corrected image includes:
   determining a matching cost space of a pixel in the area;
   determining a V-D space based on the matching cost space; and
   determining the parallax between a row of pixels in the area and a corresponding row of pixels in the second corrected image based on the V-D space.

2. The method of claim 1, wherein the determined dimension of the target includes a length, a height, or a width of the target.

3. The method of claim 1, wherein acquiring the first image and the second image of the target by the one or more cameras includes:
   obtaining one or more preliminary images captured by the one or more cameras;
   identifying an object based on the one or more preliminary images;
   determining a target based on the object;
   transmitting a capturing instruction for capturing the first image and the second image of the target to the one or more cameras; and
   capturing, by the one or more cameras, the first image and the second image of the target according to the capturing instruction.

4. The method of claim 1, wherein determining the V-D space based on the matching cost space includes compressing the matching cost space based on pixels in the row in the area according to a condition that a distance between a left edge pixel on the row and a right edge pixel on the row is equal to a first threshold.

5. The method of claim 1, wherein determining the first outline of the target in the first corrected image includes:
   determining a confidence coefficient of a pixel in the area based on the matching cost space; and
   determining the first outline of the target in the first corrected image based on the confidence coefficient.

6. The method of claim 1, wherein determining the first outline of the target in the first corrected image includes:
   obtaining a response value of each pixel in the area by performing an edge fitting to the pixels in the area;
   selecting pixels of which the response values are larger than a second threshold; and
   determining the first outline of the target in the first corrected image based on the selected pixels.

7. The method of claim 1, wherein determining the dimension of the target based at least in part on the camera parameter, the parallax, and the outline of the target includes:
   determining a second outline of the target in the second corrected image based on the parallax;
   generating a three-dimensional outline model based on the camera parameter, the parallax, the first outline of the target in the first corrected image, and the second outline of the target in the second corrected image; and
   determining the dimension of the target based on the three-dimensional outline model.

8. The method of claim 7, wherein determining the second outline of the target in the second corrected image based on the parallax includes:
   determining a first plurality of pixels on the first outline of the target in the first corrected image;
   determining a second plurality of pixels in the second corrected image, the second plurality of pixels corresponding to the first plurality of pixels; and
   determining the second outline of the target in the second corrected image based on the second plurality of pixels and the parallax.

9. The method of claim 7, wherein generating the three-dimensional outline model based on the camera parameter, the parallax, the first outline of the target in the first corrected image, and the second outline of the target in the second corrected image includes:
   determining a three-dimensional outline model in a camera coordinate system based on the first outline of the target in the first corrected image and the second outline of the target in the second corrected image; and
   transforming the three-dimensional outline model in the camera coordinate system into a three-dimensional outline model in a world coordinate system based on the camera parameter.

10. The method of claim 9, the camera coordinate system or the world coordinate system includes an origin, a first coordinate axis, a second coordinate axis, and a third coordinate axis, wherein:
    in the camera coordinate system; the origin is an optical center of the camera, the first coordinate axis is an optical axis of the camera, the second coordinate axis is an axis parallel to a reference plane and vertical to the first coordinate axis, the third coordinate axis is an axis vertical to a plane of the first axis and the second axis; and
    in the world coordinate system, the origin is a point in the real world, and in the reference plane, the first coordinate axis is a projection of the first axis of the camera coordinate system on the reference plane, the second coordinate axis are parallel to the reference plane and vertical to the first axis, and the third coordinate is vertical to the reference plane.

11. The method of claim 10, wherein determining the dimension of the target based on the three-dimensional outline model includes:
    determining a point cloud distribution of the three-dimensional outline model along the first coordinate axis, the second coordinate axis, and the third coordinate axis in the world coordinate system; and determining the length, the height, or the width of the target based on the point cloud distribution.

12. The method of claim 2, further including:
   determining whether at least one of the length, the height, or the width of the target is larger than a third threshold, a fourth threshold, or a fifth threshold, respectively; and
   determining the target is oversized according to a result of the determination whether at least one of the length, the height, or the width of the target is larger than the third threshold, the fourth threshold, or the fifth threshold, respectively.

13. The method of claim 1, wherein determining the area in the first corrected image includes:
   determining a dynamic foreground in the first corrected image; and
   determining the area based on the dynamic foreground.

14. A device comprising:
   memory storing instructions; and
   at least one processor that executes the instructions to perform operations comprising:
      determining a camera parameter, the camera parameter comprising at least one of a focal length, a yaw angle; a roll angle; a pitch angle or a height of a camera;
      acquiring a first image and a second image of an target based on the camera parameter;
      generating a first corrected image and a second corrected image by correcting the first image and the second image, wherein vertical coordinates or horizontal coordinates of corresponding pixels in the first corrected image and the second corrected image in image coordinate system are equal;
      determining an area in the first corrected image; and
      determining a first outline of the target in the first corrected image based on the area;
      determining a parallax between a pixel in the first corrected image and a corresponding pixel in the second corrected image;
      determining an outline of the target; and
      determining a dimension of the target based on the camera parameter, the parallax, and the outline of the target;
         wherein determining the parallax between the pixel in the first corrected image and the corresponding pixel in the second corrected image includes:
         determining a matching cost space of a pixel in the area;
         determining a V-D space based on the matching cost space; and
         determining the parallax between a row of pixels in the area and a corresponding row of pixels in the second corrected image based on the V-D space.

* * * * *